United States Patent
Hansen

(10) Patent No.: US 12,302,877 B2
(45) Date of Patent: May 20, 2025

(54) ICE FISHING NET

(71) Applicant: Icelander Inventions LLC, Prior Lake, MN (US)

(72) Inventor: Eric Hansen, Prior Lake, MN (US)

(73) Assignee: Icelander Inventions LLC, Prior Lake, MN (US)

( * ) Notice: Subject to any disclaimer, the term of this patent is extended or adjusted under 35 U.S.C. 154(b) by 114 days.

(21) Appl. No.: 18/110,623

(22) Filed: Feb. 16, 2023

(65) Prior Publication Data

US 2024/0276961 A1    Aug. 22, 2024

(51) Int. Cl.
*A01K 77/00*    (2006.01)
*A01K 97/01*    (2006.01)

(52) U.S. Cl.
CPC ............ *A01K 77/005* (2022.02); *A01K 77/00* (2013.01); *A01K 97/01* (2013.01)

(58) Field of Classification Search
CPC ....... A01K 77/00; A01K 77/005; A01K 97/01
USPC .......................................... 43/11, 12, 7, 8, 5
See application file for complete search history.

(56) References Cited

U.S. PATENT DOCUMENTS

| | | | | |
|---|---|---|---|---|
| 453,776 | A * | 6/1891 | McCory ................. | A01D 11/06 403/93 |
| 525,619 | A * | 9/1894 | Pearsons ................ | A01K 77/00 43/12 |
| 723,484 | A * | 3/1903 | Paley ..................... | A01K 77/00 43/12 |
| 737,428 | A * | 8/1903 | Lindsey et al. ........ | A01K 77/00 15/144.1 |
| 823,113 | A * | 6/1906 | French et al. ......... | A01K 77/00 43/12 |
| 1,233,074 | A * | 7/1917 | Loflin .................... | A01K 97/14 294/19.3 |
| 2,457,922 | A * | 1/1949 | Robinson ............... | A01K 77/00 43/12 |
| 2,461,941 | A * | 2/1949 | Sutton .................... | A01K 97/14 403/111 |
| 2,480,924 | A * | 9/1949 | Heger .................... | A01K 97/05 294/103.1 |
| 2,482,157 | A * | 9/1949 | Crot ....................... | A01K 77/00 43/12 |
| 2,645,874 | A * | 7/1953 | Collins .................. | A01K 77/00 16/440 |

(Continued)

FOREIGN PATENT DOCUMENTS

| | | | | |
|---|---|---|---|---|
| CA | | 1203200 A | * 4/1986 | ............. A01K 97/01 |
| CN | | 205671294 U | * 11/2016 | |

(Continued)

*Primary Examiner* — Darren W Ark
(74) *Attorney, Agent, or Firm* — Dietz Law Office LLC

(57) ABSTRACT

An ice fishing net apparatus that may be utilized to lift fish out of an ice fishing hole. The ice fishing net of the invention includes a hoop and net that is actuatable between a landing position and a netting position. The hoop has a round shape when viewed from the xy plane of an xyz coordinate system and further includes additional bends as viewed from the xz and yz planes such that the hoop conforms to a cylindrical sidewall of an ice fishing hole when oriented in either a landing or netting position. The ice fishing apparatus is particularly useful for netting fish from an ice hole while the user remains in an upright, standing position.

20 Claims, 29 Drawing Sheets

(56) References Cited

U.S. PATENT DOCUMENTS

| | | | | |
|---|---|---|---|---|
| 2,653,403 A * | 9/1953 | Oslund | ............... | A01K 77/00 43/79 |
| 2,725,253 A * | 11/1955 | Wallman | ............ | F16B 45/034 294/26 |
| 2,759,758 A * | 8/1956 | Yancey | ............... | A01K 97/14 294/82.17 |
| 2,795,888 A * | 6/1957 | Garland | ............... | A01K 97/20 43/55 |
| 3,018,579 A * | 1/1962 | Girden | ............... | A01K 81/00 43/4 |
| 3,031,789 A * | 5/1962 | Edgington | ........... | A01K 73/12 43/55 |
| 3,071,401 A * | 1/1963 | Maierhofer | .......... | A01K 97/14 294/111 |
| 3,208,786 A * | 9/1965 | Eddleman | ............ | B65D 25/08 294/115 |
| 3,287,845 A * | 11/1966 | Smith | ............... | A01K 97/18 43/53.5 |
| 3,289,850 A * | 12/1966 | Gubash | ............... | A01K 97/01 210/470 |
| 3,670,444 A * | 6/1972 | Dieterich | ............. | A01K 77/00 43/12 |
| 3,722,940 A * | 3/1973 | Misjak | ............... | A01K 97/01 43/4 |
| 3,747,253 A * | 7/1973 | Gangi | ............... | A01K 97/14 294/24 |
| 3,857,787 A * | 12/1974 | Kinne | ............... | A01K 97/01 210/470 |
| 4,351,126 A * | 9/1982 | Simonson | ............ | A01K 97/14 294/26 |
| 4,446,646 A * | 5/1984 | van't Veld | ............ | A01K 77/00 43/12 |
| 4,674,221 A | 6/1987 | Weber | | |
| 4,769,939 A * | 9/1988 | Gonska | ............... | A01K 97/14 294/24 |
| 4,783,926 A * | 11/1988 | McKinney | ............ | A01K 97/14 294/19.3 |
| 4,866,872 A * | 9/1989 | Guilbault | ............. | A01K 97/01 43/4.5 |
| 5,048,220 A * | 9/1991 | Harris | ............... | A01K 97/01 43/55 |
| 5,072,538 A * | 12/1991 | Hendricks | ........... | A01K 97/01 210/470 |
| 5,099,597 A * | 3/1992 | Whistle | ............... | A01K 77/00 440/109 |
| 5,140,767 A * | 8/1992 | Traut | ............... | A01K 97/01 210/470 |
| 5,218,777 A * | 6/1993 | Olszowka | ............ | A01K 97/01 43/4 |
| 5,385,666 A * | 1/1995 | Perlsweig | ............. | E04H 4/1609 4/496 |
| 5,581,929 A * | 12/1996 | Molloy | ............... | A01K 77/00 43/12 |
| 5,784,824 A * | 7/1998 | Myroniuk | ............ | A01K 77/00 43/4 |
| 5,822,908 A * | 10/1998 | Blanchard | ........... | A01K 77/00 43/7 |
| 6,065,239 A | 5/2000 | Thomas et al. | | |
| 6,412,212 B1 * | 7/2002 | Horgan | ............... | A01K 77/00 43/11 |
| 6,412,213 B1 * | 7/2002 | Wellard | ............... | A01K 77/00 43/12 |
| 6,615,533 B2 * | 9/2003 | Wellard | ............... | A01K 77/00 43/12 |
| 6,618,978 B1 * | 9/2003 | Miranowski | ......... | A01K 97/01 43/4 |
| 6,684,553 B1 * | 2/2004 | Holum | ............... | A01K 97/01 43/4 |
| 6,694,662 B1 * | 2/2004 | McClure | ............. | A01K 97/01 43/4 |
| 6,907,689 B2 * | 6/2005 | Pendzimas | ........... | A01K 97/01 43/4 |
| 6,981,346 B1 * | 1/2006 | Wiezycki | ............ | A01K 97/01 43/4 |
| 7,162,826 B1 * | 1/2007 | Zander | ............... | A01K 97/14 43/4 |
| 7,730,657 B1 * | 6/2010 | Gierucki | ............. | A01K 77/00 294/111 |
| 8,261,482 B1 | 9/2012 | Buchanan | | |
| 8,813,414 B2 * | 8/2014 | Jones | ............... | A01K 97/14 294/175 |
| 8,943,735 B2 * | 2/2015 | Brown | ............... | A01K 97/01 43/4.5 |
| 9,357,758 B1 | 6/2016 | Smith | | |
| 9,439,406 B1 * | 9/2016 | Kuny | ............... | A01K 97/01 |
| 10,334,831 B2 | 7/2019 | Kudner | | |
| 10,595,518 B1 * | 3/2020 | Patterson | ........... | A01K 74/00 |
| 11,134,665 B2 * | 10/2021 | Dresch | ............... | A01K 97/01 |
| 2001/0045047 A1 | 11/2001 | Smolinski | ........... | A01K 97/01 43/5 |
| 2002/0011017 A1 * | 1/2002 | Blaschke | ............ | A01K 77/00 43/12 |
| 2002/0194772 A1 * | 12/2002 | Akhtar | ............... | A01K 77/00 43/107 |
| 2004/0068914 A1 * | 4/2004 | Wellard | ............. | A01K 77/00 43/12 |
| 2005/0005497 A1 * | 1/2005 | Boltan | ............... | A01K 77/00 43/7 |
| 2006/0059763 A1 * | 3/2006 | Passint | ............... | A01K 77/00 43/7 |
| 2009/0100739 A1 | 4/2009 | Resch et al. | | |
| 2010/0132242 A1 * | 6/2010 | Emter, Jr. | ............. | A01K 77/00 43/11 |
| 2010/0200308 A1 | 8/2010 | Pigott | | |
| 2011/0094145 A1 * | 4/2011 | Marx | ............... | A01K 77/00 43/11 |
| 2013/0097913 A1 * | 4/2013 | Hume | ............... | A01K 77/00 43/11 |
| 2014/0053451 A1 * | 2/2014 | Brown | ............... | A01K 97/01 43/55 |
| 2015/0082686 A1 * | 3/2015 | Merritt | ............... | A01K 97/01 43/55 |
| 2015/0121744 A1 * | 5/2015 | Coppola | ............. | A01M 3/002 43/110 |
| 2016/0007580 A1 | 6/2016 | Best et al. | | |
| 2017/0354134 A1 * | 12/2017 | Powell | ............... | A01K 97/01 |
| 2018/0249694 A1 | 9/2018 | Dresch | | |
| 2019/0281801 A1 * | 9/2019 | Powers | ............... | A01K 77/00 |
| 2024/0130342 A1 * | 4/2024 | Hamilton | ............ | A01K 77/00 |
| 2024/0334917 A1 * | 10/2024 | Kittelson | ........... | A01K 77/00 |

FOREIGN PATENT DOCUMENTS

| | | | | |
|---|---|---|---|---|
| CN | 208656845 U | * | 3/2019 | |
| CN | 208925016 U | * | 6/2019 | ............ A01K 77/00 |
| CN | 209268420 U | * | 8/2019 | |
| CN | 210299125 U | * | 4/2020 | |

\* cited by examiner

ICE FISHING NET

CROSS-REFERENCE TO RELATED APPLICATIONS

Not Applicable

Federal Sponsorship

Not Applicable

Joint Research Agreement

Not Applicable

TECHNICAL FIELD

This invention pertains generally to ice fishing nets and the like that may be used to reduce the number of lost fish when pulling the fish through an ice hole. More specifically, this invention pertains to an ice fishing net that actuates between a landing position and a netting position. The net of the present invention conforms to the sidewalls in both the landing and netting positions, allowing a user to slide the net past and under a fish being pulled through an ice hole and actuating the net under the fish, thereby eliminating substantial gaps between the net and the ice hole. The net may also be used to block the ice hole from underneath the fish once the fish has been pulled into the hole. Further, the present invention may be utilized to maintain the ice fishing hole by using the net to remove slush and ice chips from the hole.

BACKGROUND

The sport of fishing remains popular in both southern and northern climates. During the winter months, in many northern climates, the surface of a lake will freeze with depths of ice exceeding 24 inches. Avid anglers continue to fish during these winter months by drilling or cutting holes through the ice and pulling caught fish through these holes. At times a fish may evade a catch when the angler attempts to pull the fish up and out of the hole. Although anglers attempt to keep constant tension on the fishing line, tension often fluctuates when the angler stops reeling or reaches down to handle the fish. Additionally, to avoid entanglement, an angler may attempt to remove other devices from the hole, such as sonar, under water imaging or hole preservation agitators, while also attempting to pull the fish up and out of the hole. This additional maneuvering may also inadvertently reduce tension in the fishing line.

In the past, various devices have been contrived to block an underside of the fishing hole as the fish is being pulled up through the hole. Some of these devices must be present in the hole prior to attempting to pull a fish through the hole. Further, an angler may attempt to position a scoop under a fish; however, prior scoops do not conform to the sidewall of the hole when in both the landing and netting orientations. Although the prior devices may block a portion of the hole when actuated to a netting or blocking orientation, the prior devices also block a significant portion of the hole when slipping the device into the hole, which interferes with the ability to pull a fish up through the hole. Although some prior devices may have a curve that conforms to the hole in the landing orientation, making it less likely to interfere with pulling a fish through the hole, these devices do not have a curve that, when actuated to the netting position, conforms to the hole. The prior scoops have gaps between the blocking portion and the ice hole sidewalls, allowing an opportunity for the fish to escape through the gaps.

Also, some of the past devices include complex levers that are actuated manually and tend to ice up or freeze in the icy conditions. Additionally, certain prior devices require a second user to operate the device while the angler attempts to bring the fish up and out of the hole. There is accordingly a need for an ice fishing net that conforms to the shape of the ice hole sidewalls when actuating between a landing position and an actuating position; allowing an angler to efficiently slide the net down an ice hole past a fish while also simultaneously pulling the fish is up through the hole. There is a further need for an ice fishing net that is operable by a user in an up-right or standing position, while allowing the user to maintain tension on the fish line as the fish is pulled up through the hole.

SUMMARY

Embodiments according to aspects of the invention provide an ice fish net that facilitates the catching of fish through a cylindrical ice hole. The ice fishing net includes an actuating member that quickly actuates the net between an aligning or landing position and netting position. When the net apparatus of the present invention is in the landing position, the apparatus generally conforms to the shape of the cylindrical sidewall, allowing the fish to be pulled past the apparatus with little interference. The hoop of the net apparatus also conforms to the shape of the cylindrical sidewall when in the netting position. As the fish is pulled up the hole, the hoop of the net may be actuated to the netting position to block the passage in the ice so that the fish is unable to swim back down the hole if the hook is released from the fish. Those familiar with ice fishing will further appreciate that the net apparatus of the present invention may be utilized without bending over or kneeling on the ice.

In accordance with aspects of the invention, an embodiment of the invention includes a handle portion, an elongated shaft and an actuatable hoop and net portion. The handle portion has a palm receiving end and a grip that is slidingly engaged with the handle. One end of the elongated shaft is fixed to the handle in a shaft receiving socket and the other end includes a wheel rotationally coupled to the shaft. The actuatable hoop and net portion are fixed to the wheel. The hoop may be fixed to the wheel with a connector or connecting member or, alternatively, may be fixed to the wheel with other fixation devices known to those skilled in the art. The elongated shaft is hollow and an actuating rod extends through the hollow interior of the shaft. The actuating rod has a first end fixed to the grip and a second end aligned and engageable with an outer circumference of the wheel. An extension or tension spring is coupled between at least one of the elongated shaft or the actuating rod and the wheel to translate a tension or torque on the wheel. A second compression spring may be positioned within the shaft to provide a force against the grip and rod. Linking members connect or couple the wheel with the tension member. When the grip is slid backward towards the palm receiving portion of the handle the actuating rod disengages with the wheel allowing the wheel to rotate from an axial aligned or landing position to a netting position. Those skilled in the art will appreciate that the hoop and net are actuatable with a single hand allowing the user to hold a fishing rod in the other hand.

In accordance with certain embodiments of the invention, the wheel has a first slot extending into the wheel from the outer circumference of the wheel at a first orientation point. The wheel further has a second slot extending into the wheel from the outer circumference of the wheel at a second orientation point. Also, the wheel has an aperture extending through the wheel at an actuating point. The first orientation point, second orientation point, and actuating point are characterizable in relation to a rotational center of the wheel and each other. The first orientation point corresponds generally with a plane of the opening of a circular hoop being aligned axially with the shaft in a landing position. The second orientation point corresponds generally with the plane of the opening of the hoop being aligned approximately perpendicular to the elongated shaft axis and in the netting position. The hoop is coupled or fixed to the wheel with a hoop connector or otherwise and is coupled or fixed to the wheel at a point spaced apart from the first orientation point. Additionally, the actuating member is coupled to the wheel at the actuating point of the wheel.

In accordance with certain embodiments of the invention the hoop has a generally circular shape as viewed from the xy plane of an xyz coordinate system which conforms to the cylindrical sidewall of an ice hole when the hoop is oriented in the netting position. Further, a portion of the hoop or a length of the hoop is further curved in both the xz and yz coordinate planes. The hoop having a circular shape that is also curved in the xz, and yz plains provides a 3D hoop to conform to the ice fishing hole sidewall when oriented in the landing position. Thus the hoop conforms to the cylindrical sidewall of an ice hole when oriented in both the landing orientation and the netting orientation with minimal gaps between the hoop and sidewall. Additionally, the net has an open end fixed to the hoop and further includes a weight coupled to a closed end of the net.

In accordance with certain embodiments of the invention the actuating member includes a tension spring and connecting or linking member. One end of the tension spring is coupled to either the shaft or the actuating rod and another end of the tension spring is connected to the connecting or linking members. A connecting member is coupled to the wheel at the actuating point of the wheel and is also coupled to the tension spring (directly or via another connecting or linking member). In this manner a continuous tension is applied to the wheel. When the tension spring is coupled to the actuating rod a tension is also applied to the actuating rod, engaging the rod against the wheel. When the tension spring is coupled to the shaft a second spring may be coupled to the grip to provide a tension against the grip and rod such that the grip returns to the actuating position and the rod is actuated towards the wheel. Those skilled in the art will appreciate that the stiffness of the two springs may vary such that significantly more load or tension is applied between the wheel and shaft than to the grip. In this manner, less force against the grip is required to overcome the tension applied to the grip than the load or tension that is applied against the wheel.

When the grip is slid back towards the palm receiving portion of the handle, the rod disengages with the wheel causing the wheel to rotate from the first landing orientation position to the second netting orientation. A rod guide may be positioned within a hollow portion of the elongated shaft. The rod guide has a first aperture extending through the rod guide that is adapted for receiving the actuating rod therethrough and second apertures extending through the rod guide that are adapted for receiving passage of the connecting member therethrough. The rod guide maintains the actuating rod within a central portion of the hollow portion of the shaft and facilitates alignment of the rod with the wheel. Spacers may be positioned between the wheel and elongated shaft to stabilize the wheel and provide a strengthened end portion of the shaft interconnecting the shaft to the wheel.

In accordance with other aspects of the invention the ice fishing net apparatus includes an elongated shaft having a hollow cross section, a handle fixed to a first end of the shaft, a grip slidingly engaged with the handle, a wheel rotationally attached to a second end of the shaft, an actuating rod extending through the hollow cross section of the shaft, an actuating member including a tension spring and connecting member, wherein one end of the tension spring is coupled to the actuating rod or shaft and another end of the tension spring is connected to the connecting member, a hoop connector coupled to the wheel, and a hoop adapted for receiving a net and wherein the hoop is coupled to the hoop connector. The wheel has a first slot extending into the wheel from an outer circumference of the wheel at a first orientation point, the wheel has a second slot extending into the wheel from the outer circumference of the wheel at a second orientation point, and the wheel has an aperture extending through the wheel at an actuating point. The first orientation point, second orientation point, and actuating point are characterizable in relation to a rotational center of the wheel and each other. The actuating rod has a first end fixed to the grip and a second end aligned with the circumference of the wheel and engageable in the first slot and second slot of the wheel. The connecting member is coupled to the wheel at the actuating point of the wheel. The hoop connector is fixed or coupled to the wheel and is spaced apart along the circumference of the wheel from the first orientation point.

In accordance with this embodiment of the invention the hoop is circular as viewed from an xy plane. A length of the hoop is further curved in both the xz and yz coordinate planes as viewed from those planes. The net has an open end fixed to the hoop and further includes a weight coupled to a closed end of the net. A rod guide is positioned within the hollow portion of the elongated shaft, wherein the rod guide has a first aperture extending through the rod guide that is adapted for receiving the actuating rod therethrough and second apertures extending through the rod guide that are adapted for receiving the connecting member therethrough. Spacers are positioned between the wheel and elongated shaft to provide added stability to the end of the elongated shaft.

In accordance with yet other aspects of the invention the ice fishing net apparatus includes an elongated shaft having a hollow cross section, a handle fixed to a first end of the shaft, a grip slidingly engaged with the handle, a wheel rotationally attached to a second end of the shaft, an actuating rod extending through the hollow cross section of the shaft, an actuating member coupled to the wheel, a hoop connector coupled to the wheel and spaced apart from the first orientation point, and a hoop adapted for receiving a net, wherein the hoop is coupled to the hoop connector and the hoop appears circular in the xy plane but the hoop also curves through the xz and yz planes when viewed from the xz, and yz planes of an xyz coordinate system.

The wheel has a first slot extending into the wheel from an outer circumference of the wheel at a first orientation point; the wheel has a second slot extending into the wheel from the outer circumference of the wheel at a second orientation point; and, the wheel has an aperture extending through the wheel at an actuating point. The first orientation point, second orientation point, and actuating point are characterizable in relation to a rotational center of the wheel and each other. The actuating rod has a first end fixed to the grip and a second end aligned with the circumference of the wheel. The actuating member is coupled to the wheel at the actuating point of the wheel. The net has an open end fixed to the hoop and further includes a weight coupled to a closed end of the net. The actuating member may include a tension spring and connecting member, such that one end of the tension spring is coupled to either the shaft or actuating rod and another end of the tension spring is connected to the connecting member, wherein the connecting member is further coupled to the wheel at the actuating point of the wheel. A rod guide may be included and positioned within the hollow cross section portion of the elongated shaft, wherein the rod guide has a first aperture extending through the rod guide that is adapted for receiving the actuating rod therethrough and second apertures extending through the rod guide that are adapted for receiving the connecting member therethrough. Spacers may be positioned between the wheel and elongated shaft to provide added stability to the shaft and wheel.

In accordance with aspects of the invention, those skilled in the art will appreciate that the orientation and structure of the shaft, wheel, and hoop may be further described in relation to a Cartesian coordinate system having x, y, and z axis and that further defines xy, yz, and xz planes. The longitudinal axis of the elongated shaft may be oriented along the x axis when in the landing position and along the z axis when in the netting position. The hoop is curved in relation to all three planes; the xy, xz, and yz planes.

When using the ice fishing net the user orients the hoop in the landing position, such that the circular plane of the hoop is aligned parallel with the shaft in the xy plane. The hoop may be slid along the sidewall of the ice hole with minimal blockage of the hole. When actuated the roundness of the hoop aligns approximately perpendicular to the axis of the elongated shaft. In this manner the hoop and net may be used to block the ice hole passage and pull the net out of the hole to net the fish.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
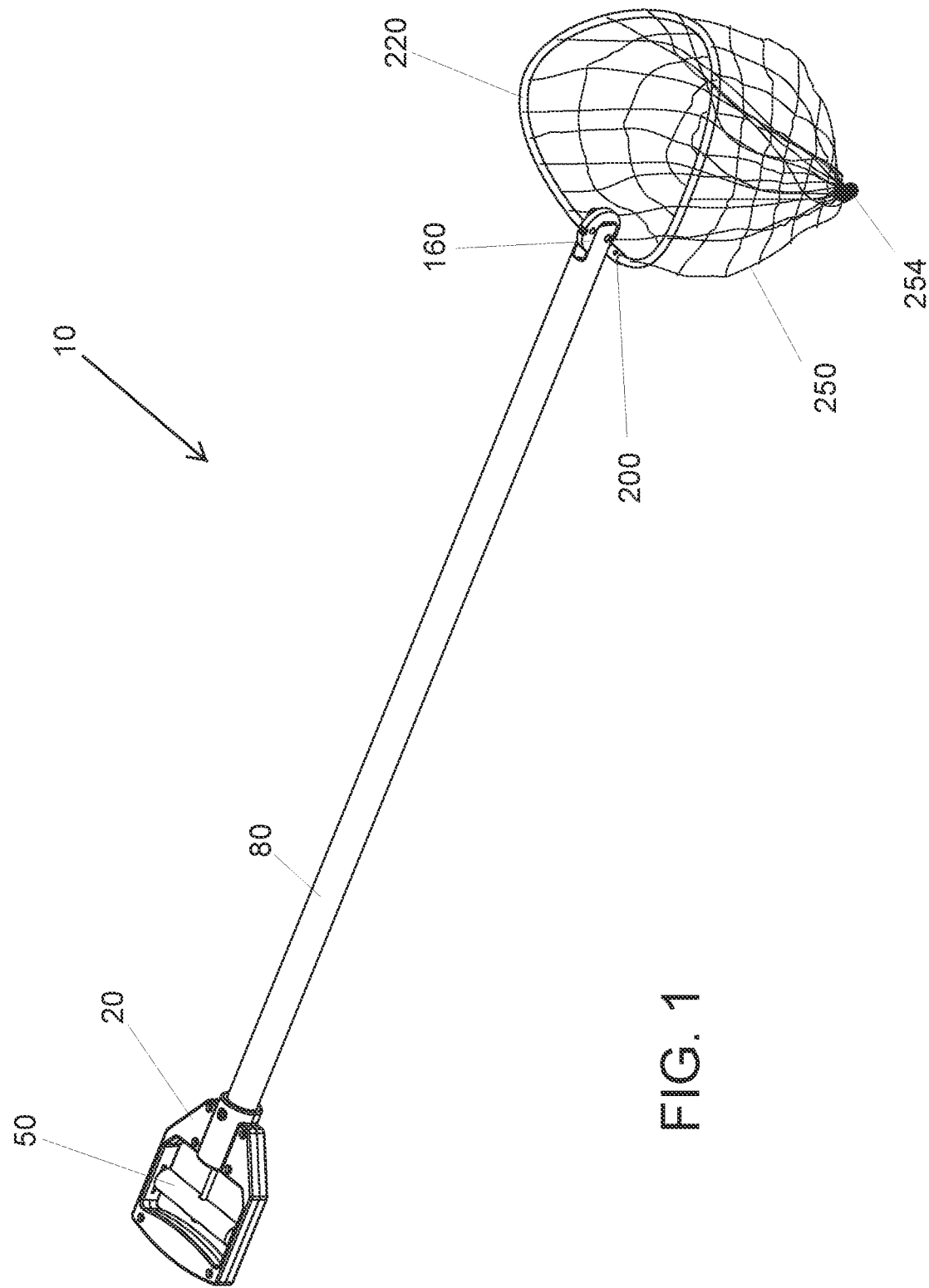
FIG. 1 is a front perspective view of an ice fishing net in accordance with an embodiment of the invention showing the hoop in an aligning position.
Figure 2:
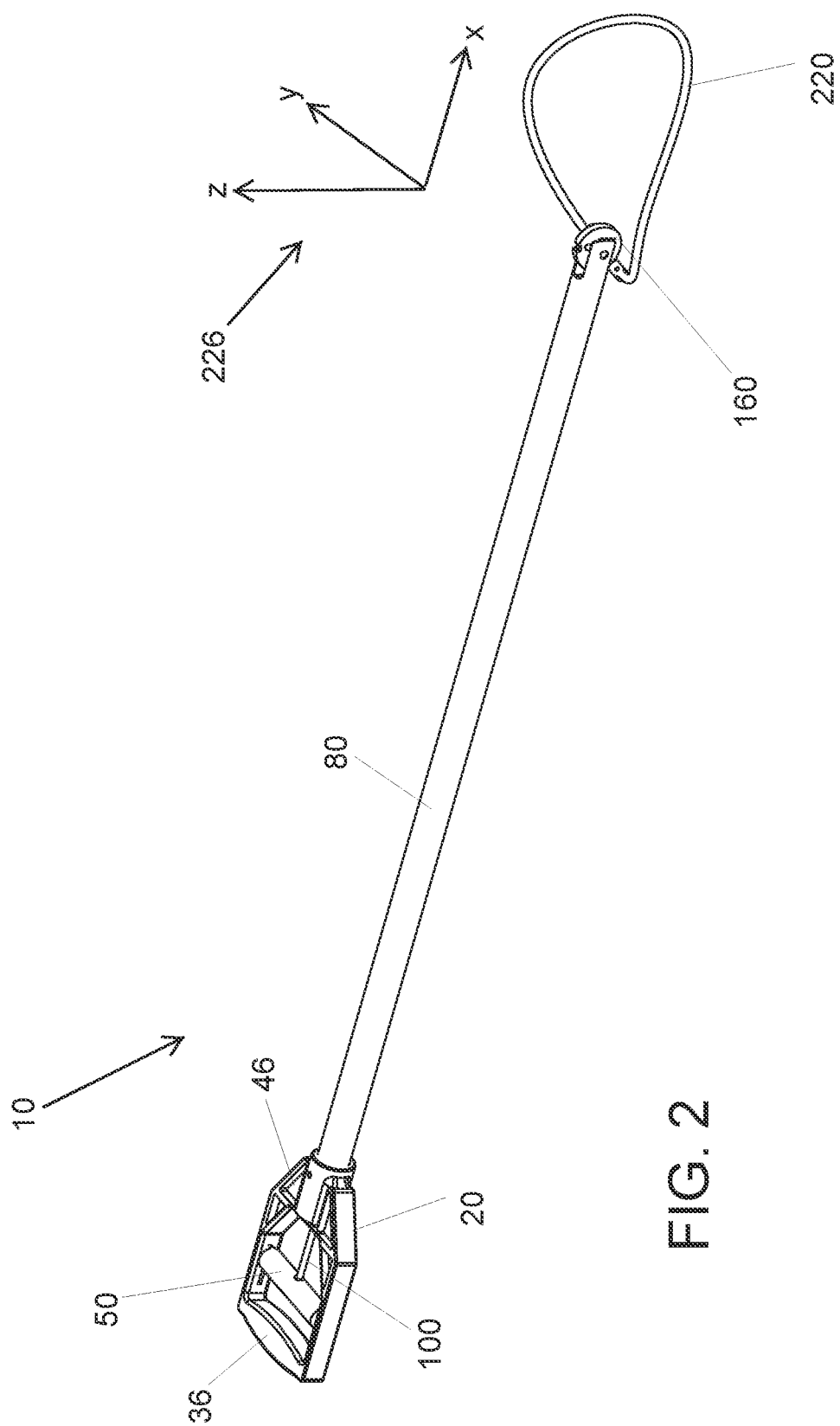
FIG. 2 is a front perspective view of an ice fishing net in accordance with an embodiment of the invention showing the hoop in an aligning position (with the net removed)

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The ice fishing net 10 of the present invention generally includes a handle having an actuatable grip 50, an end of an elongated shaft 80 coupled to the handle, a wheel 160 rotationally attached to the other end of the shaft 80, and a hoop connector 200 and hoop 220 coupled to the wheel 160. In certain embodiments of the invention, a compression spring 132 actuates the grip 50 (together with actuating rod 100) and a tension spring 140 actuates the wheel 160. In other embodiments, the tension spring 140 is oriented to actuate both the grip 50 and wheel 160. Those skilled in the art will appreciate that various suitable materials may be utilized for manufacturing the various components without departing from the scope of the present invention. By way of example, without limitation intended, the handle, grip, shaft and hoop are preferably made from durable, lightweight materials suitable for use in the outdoors and exposure to wet and freezing conditions. These materials may include polymers and lightweight metals and alloys such as aluminum, titanium and titanium alloys. The wheel and hoop connector may be manufactured from other high strength, durable materials such as a stainless steel or other alloys suitable for use in wet environments.

The length of the elongated shaft 80 may be made for use when kneeling having a range between 12-20 inches or may be made longer, to allow use while standing, having a range between 30-48 inches and the diameter of the shaft may preferably range between ¾-1½ inches. Those skilled in the art will appreciate that other materials and dimension may be incorporated without departing from the scope of the invention.

Figure 3:
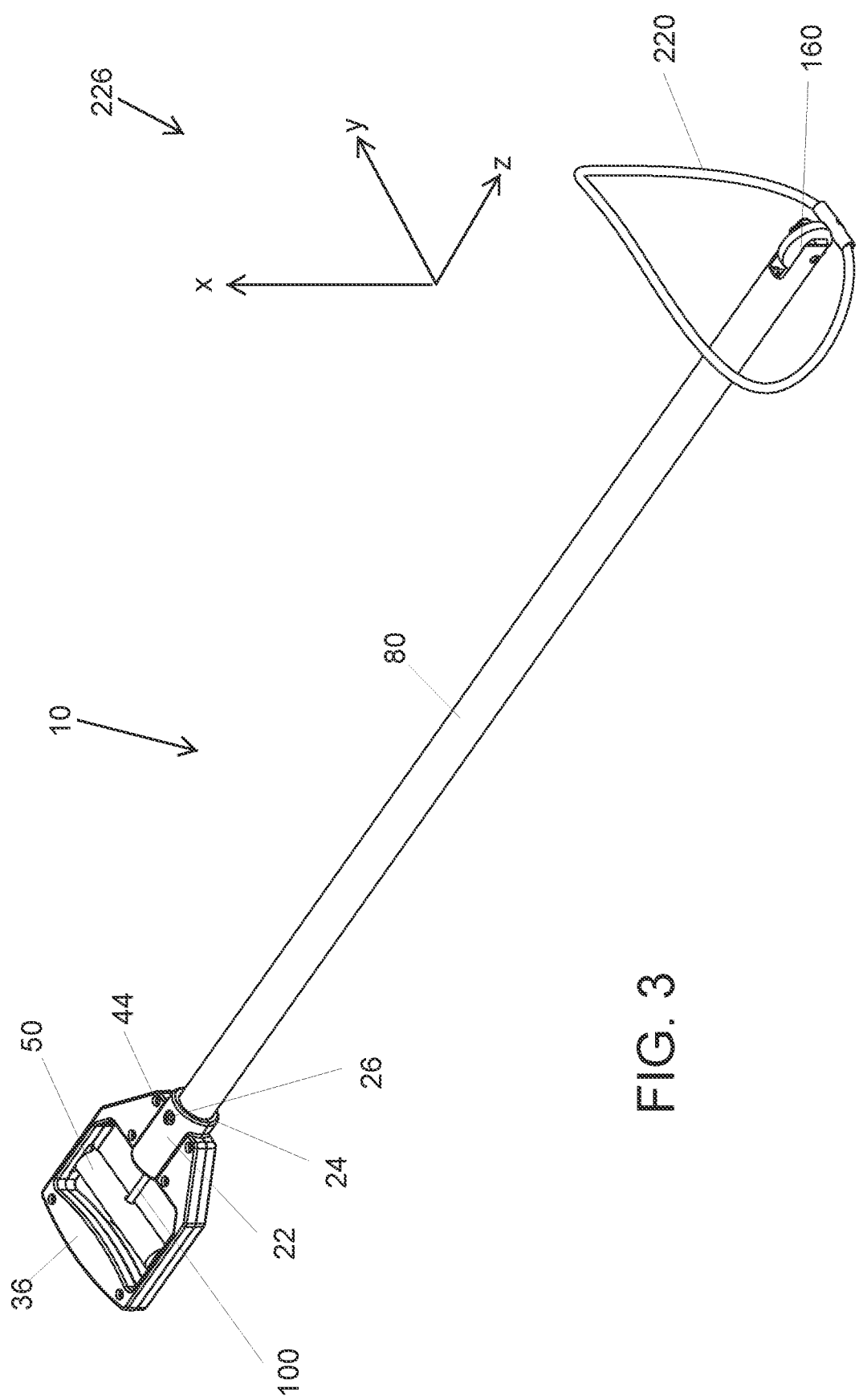
FIG. 3 is an end perspective view of an ice fishing net in accordance with an embodiment of the invention showing the hoop in a netting position (with the net removed)
Figure 4:
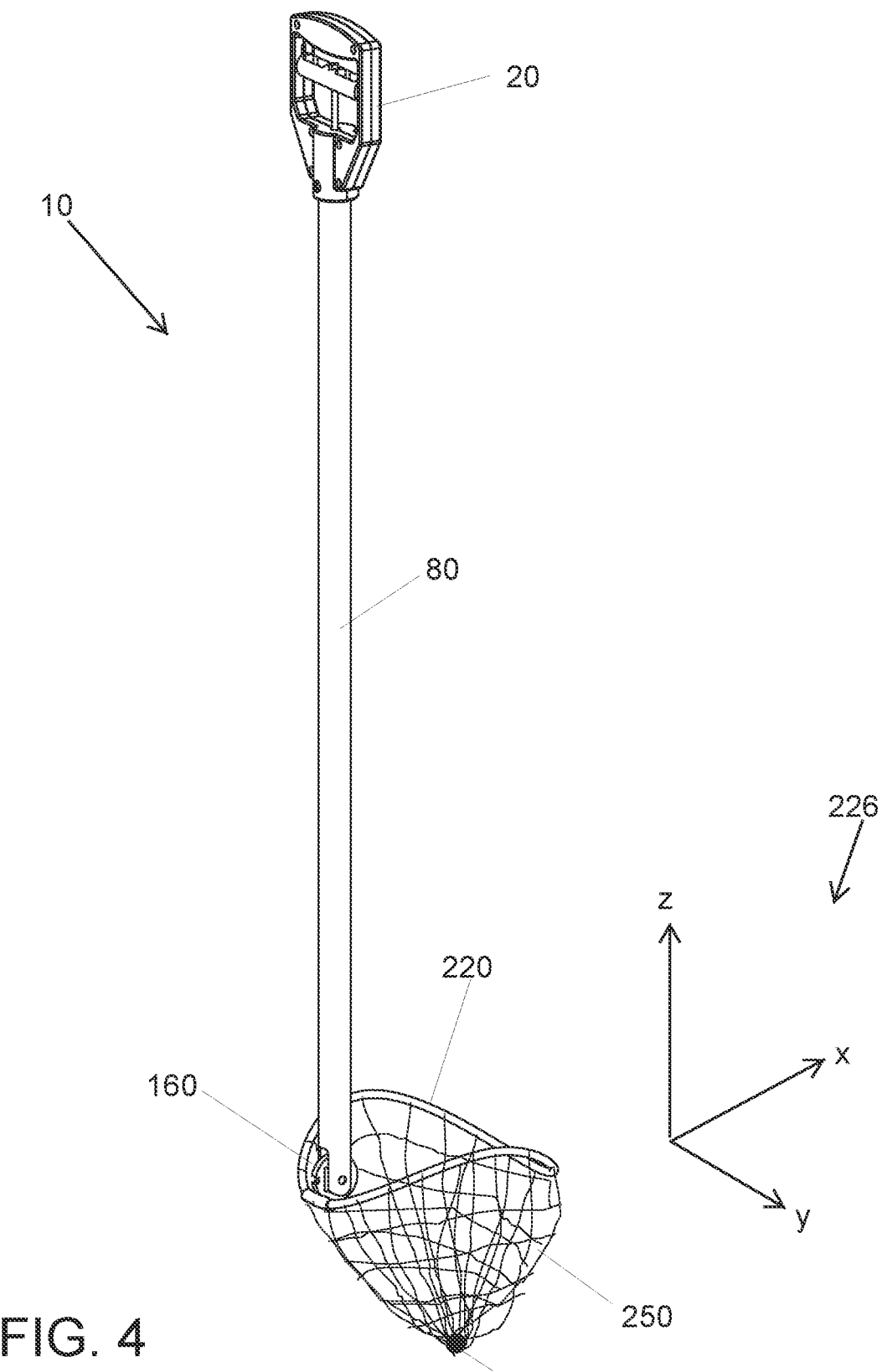
FIG. 4 is a side perspective view of an ice fishing net in accordance with an embodiment of the invention showing the hoop and net in a netting position.
Figure 5:
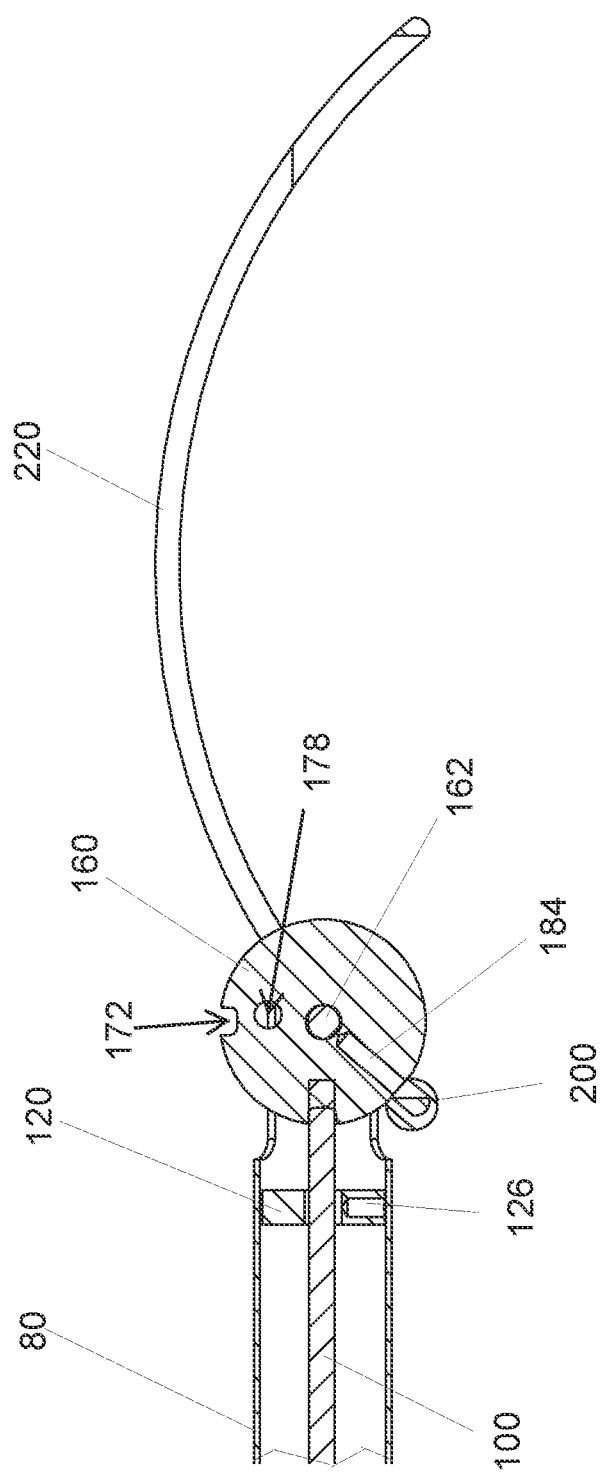
FIG. 5 is a partial sectional side view of a portion of the hoop, wheel and shaft in accordance with an embodiment of the invention.
Figure 6:
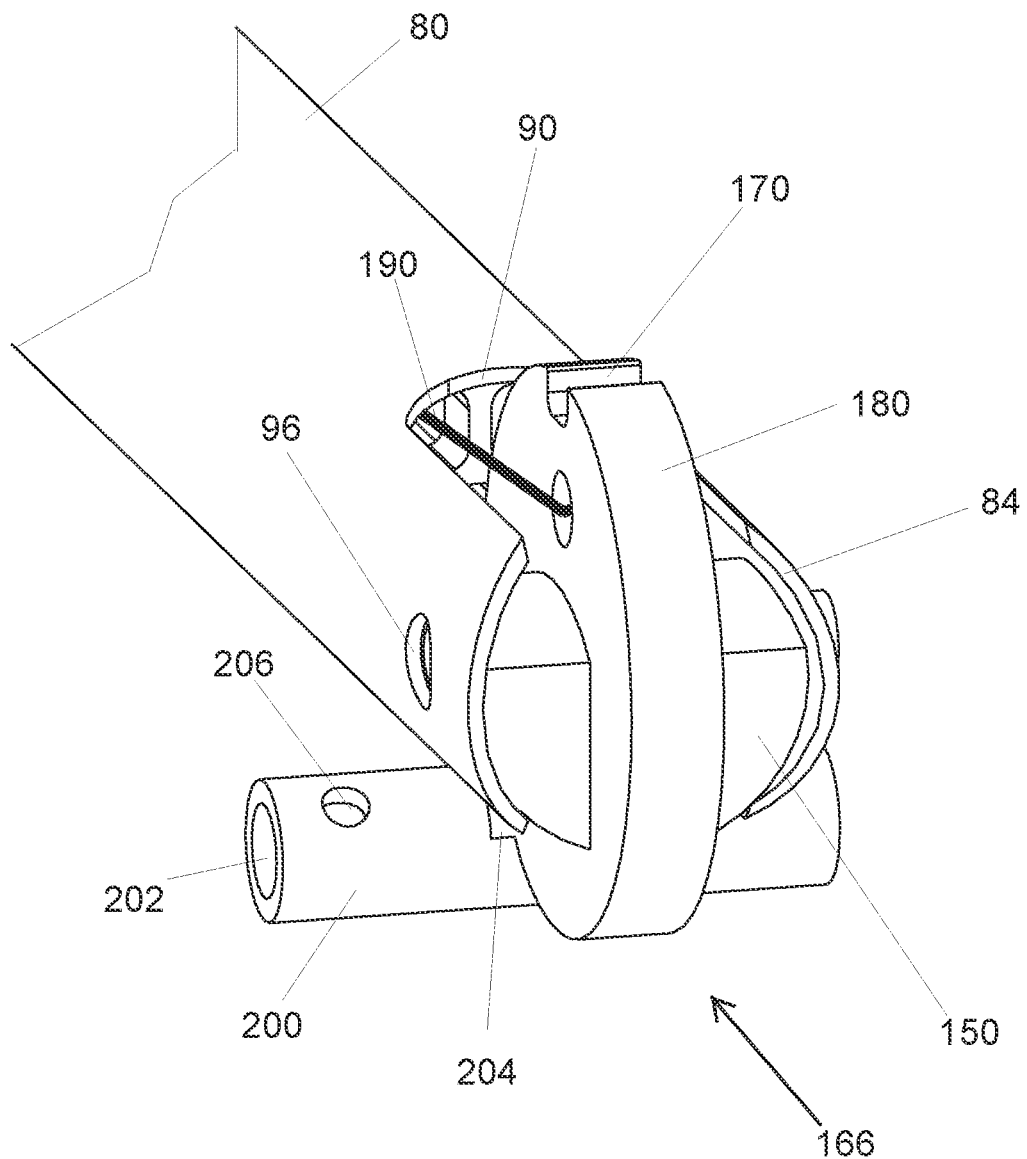
FIG. 6 is a partial sectional end perspective view of the ice fishing net in accordance with an embodiment of the invention showing the wheel in the aligning position.

With reference to the Figures, the ice fishing net apparatus 10 is described in greater detail. Referring first to FIGS. 1-4, the ice fishing net apparatus 10 is illustrated in the landing position (FIGS. 1 and 2) and the netting position (FIGS. 3 and 4). The relative orientation of the hoop 220 with respect to the shaft 80 and the shape of the hoop 220 of the ice fishing net apparatus 10 may be described with reference to a Cartesian coordinate system 226. The hoop 220 has a generally circular shape as viewed from the xy plane (see also FIG. 17), however the curvature of the hoop also varies in the z direction (along the z axis), thereby forming a three-dimensional hoop having a curvature extending through multiple planes. When the hoop 220 is oriented in the landing position, the longitudinal axis of the elongated shaft 80 aligns along the x axis and the hoop curves through the xy, xz and yz planes such that the hoop conforms to the cylindrical sidewall of an ice hole. When the hoop is oriented in the netting position, the elongated shaft 80 aligns along the z axis and the hoop curves through the xy, xz and yz planes such that the hoop has a round perimeter that conforms to the cylindrical sidewall (see FIG. 17).

Generally, the net apparatus 10 has a handle 20 attached to elongated shaft 80. An actuatable grip 50 is contained and slides within the handle 20 to actuate the rod 100 within the shaft 80. The actuating rod 100 engages with wheel 160 to retain the hoop 220 in either the landing or netting position. The hoop 220 is connected to the wheel 160 via a wheel connector 200. Also attached to the hoop is netting 250. An open end of the netting is coupled about the hoop, and the closed end of the netting may include a weighted portion 254. The weighted portion 254 tends to help a user control the orientation of the net when in the landing position, thereby hanging along a relatively parallel axis to the elongated shaft when inserting the net apparatus 10 into an ice hole. The handle may be constructed in two pieces (see FIG. 1) or as a solid component (see FIG. 2). The shaft receiving portion 22 of the handle 20 includes a shaft receiving socket 24. An aperture 26 extends into the socket 24 from the shaft receiving portion 22. A fastener of known suitable construction such as a rivet or screw (not illustrated) extends through the aperture of the handle and fixes the shaft 80 to the handle 20. Handle 20 includes a palm receiving portion 36 and may be constructed in mirroring halves or may be constructed as a solid unitary component. When made of equal halves, the handle includes securing or fixing portions 44 (through which rivets, screws or other fasteners may be inserted), to secure the two halves together, and relief pockets 46 to reduce the weight and amount of material of the handle.

Figure 12:
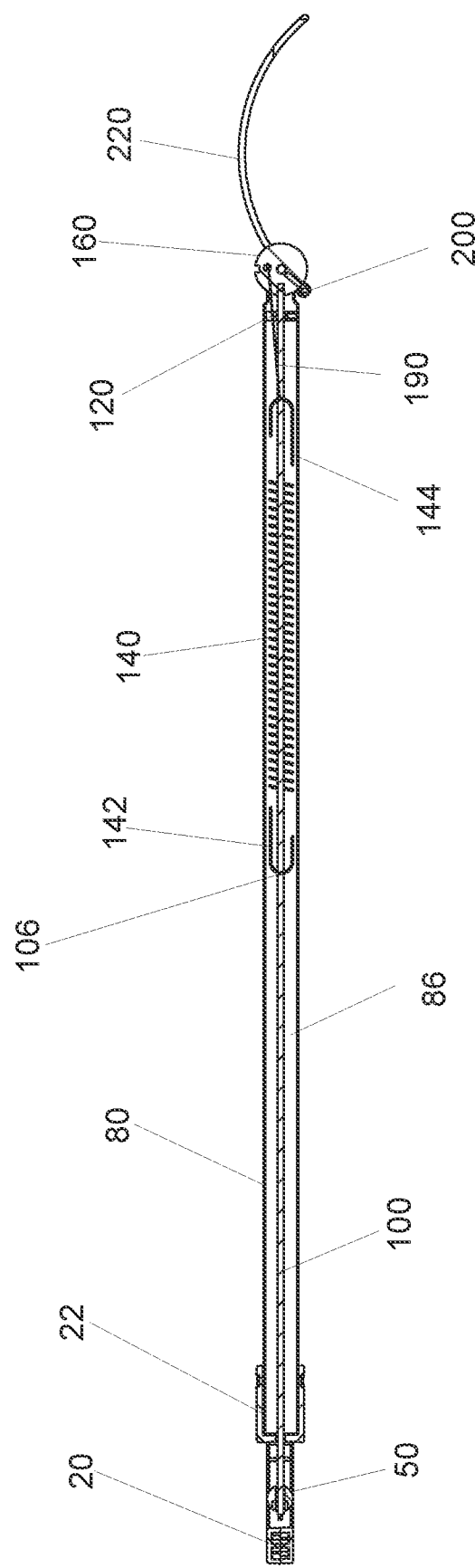
FIG. 12 is a partial side sectional view of an ice fishing net in accordance with an embodiment of the invention.
Figure 13:
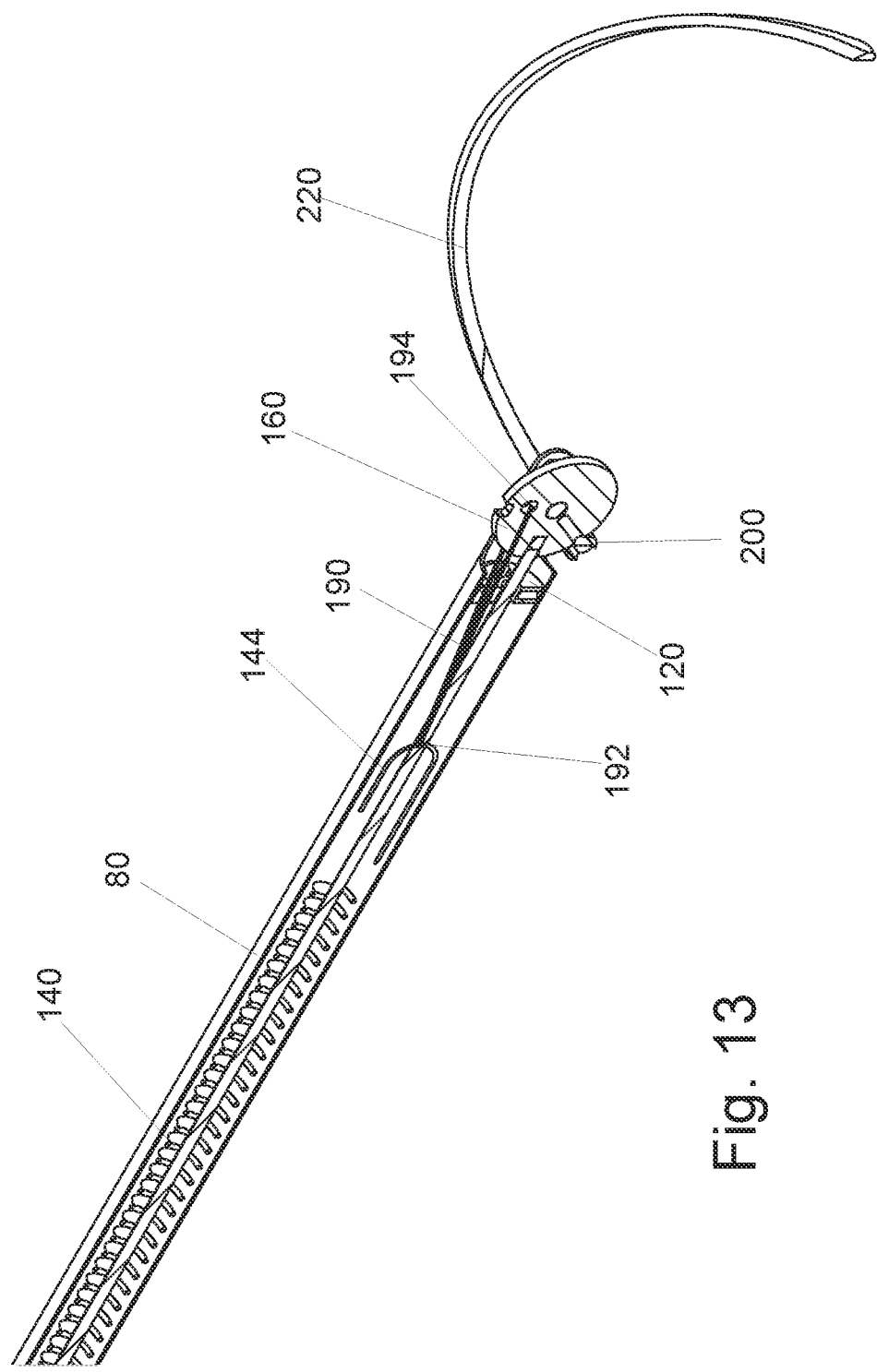
FIG. 13 is a partial sectional side perspective view of a portion of the netting end of the ice fishing net in accordance with an embodiment of the invention.

With reference to FIGS. 5-9, the interaction between the actuating rod 100 and wheel 160, when in the landing and netting positions, are described in further detail. Wheel 160 is rotationally coupled to shaft 80 at the wheel end 84 of the shaft. Actuating rod 100 has a first end fixed to the grip and a free end that cooperates with wheel 160. The actuating rod 100 extends through the hollow cross section 86 of the shaft 80 (the hollow cross section is identified with reference numeral 86 in FIG. 12). The wheel receiving end 84 of the shaft includes a wheel receiving slot 90 that has a radius 92. An aperture 96 extends through the wheel end 84 of the shaft 80 and is adapted for receiving a rotation axle or wheel pin 196 (the rotation axle is identified with reference numeral 196 in FIG. 16). Wheel 160 includes a center bearing or hub 162 that receives wheel pin 196. Rim 198 of the wheel pin 196 restricts the wheel pin 196 from sliding through and out of the shaft 80. The diameter of the other end of the wheel pin may be enlarged after insertion to restrict the pin within the shaft. Rotationally mounting the wheel 160 to the shaft 80 with a solid rivet is preferred, however other pins, such as a pin and cotter arrangement, may be utilized without departing from the scope of the invention. First rod receiving slot 164 and second rod receiving slot 170 are spaced about circumference 180 of the wheel and extend into the wheel from the outer edge or circumference 180 of the wheel 160.

Figure 7:
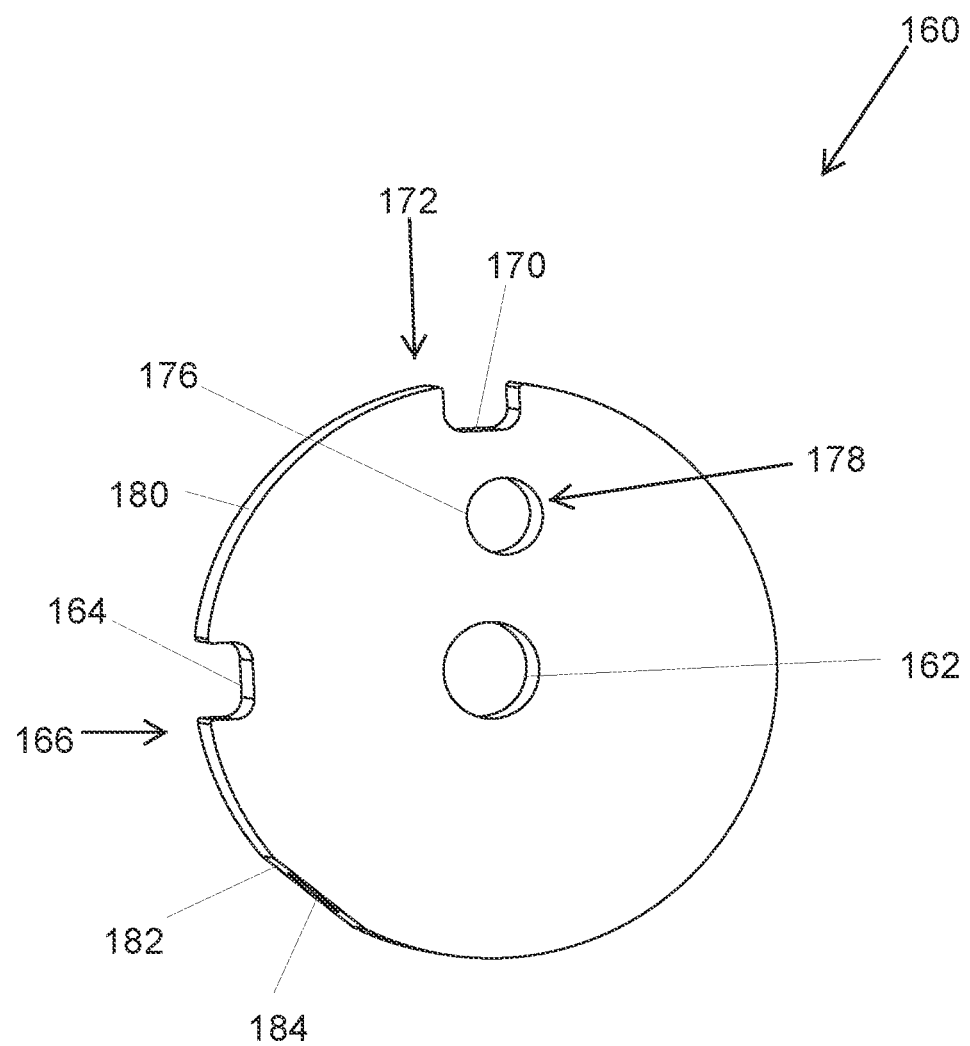
FIG. 7 is a perspective side view of the wheel of the ice fishing net in accordance with an embodiment of the invention showing the wheel in the aligning orientation.
Figure 8:
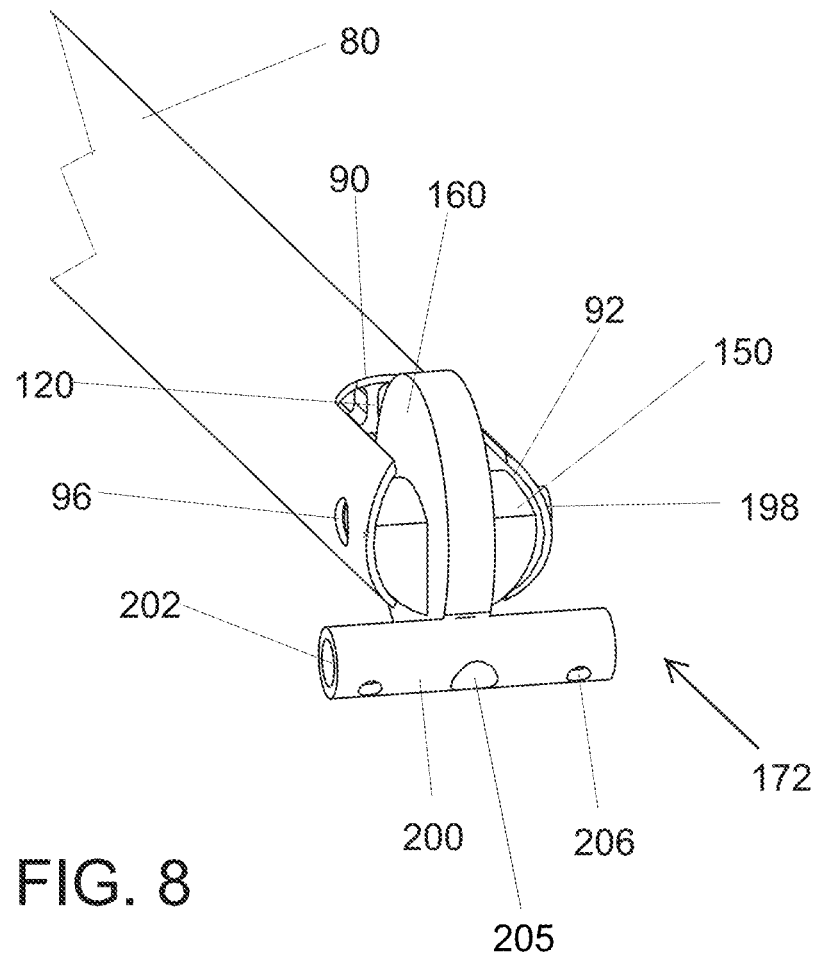
FIG. 8 is a partial sectional end perspective view of the ice fishing net in accordance with an embodiment of the invention showing the wheel in the netting position.
Figure 9:
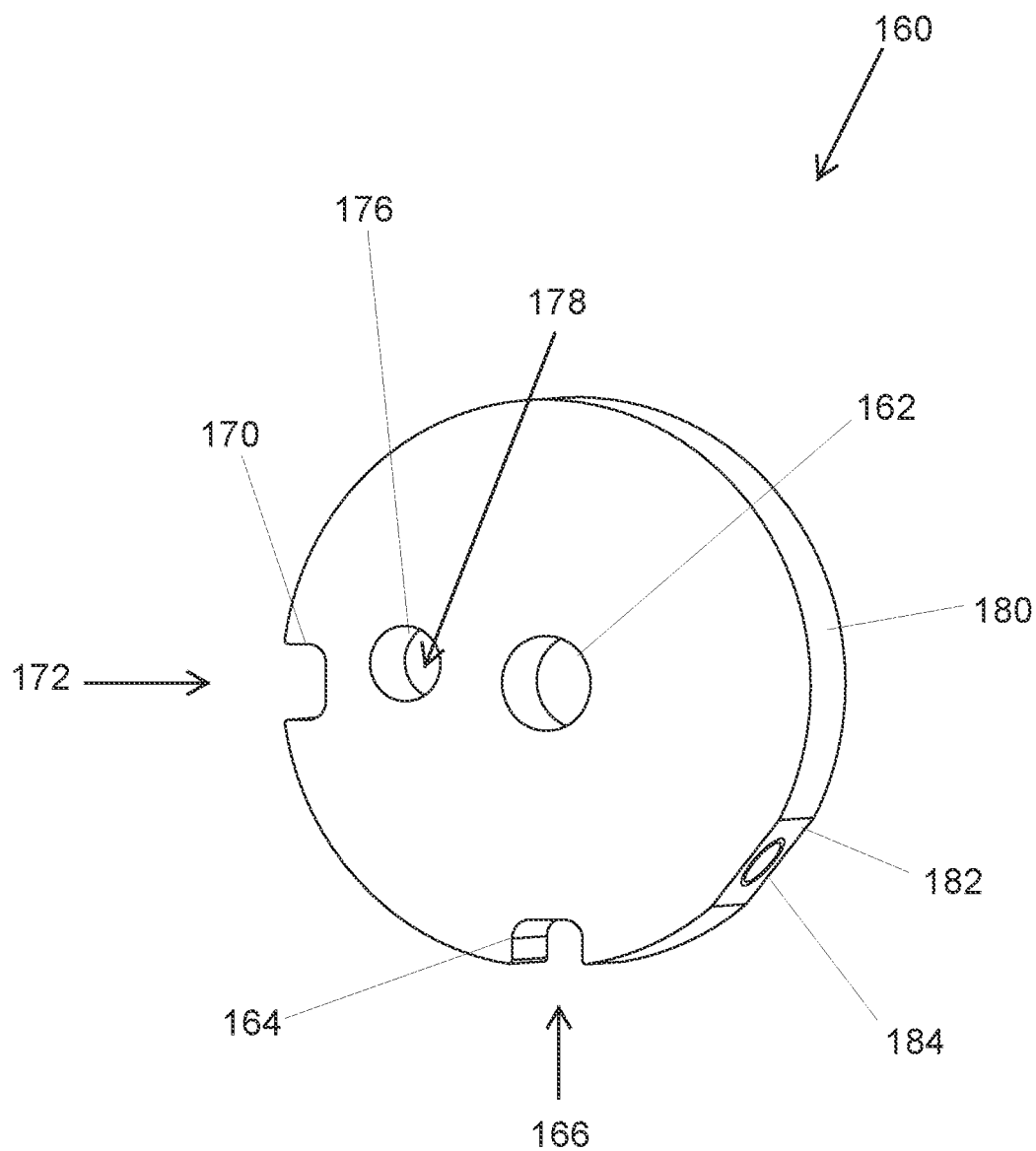
FIG. 9 is a perspective side view of the wheel of the ice fishing net in accordance with an embodiment of the invention showing the wheel in the netting orientation.
Figure 10:
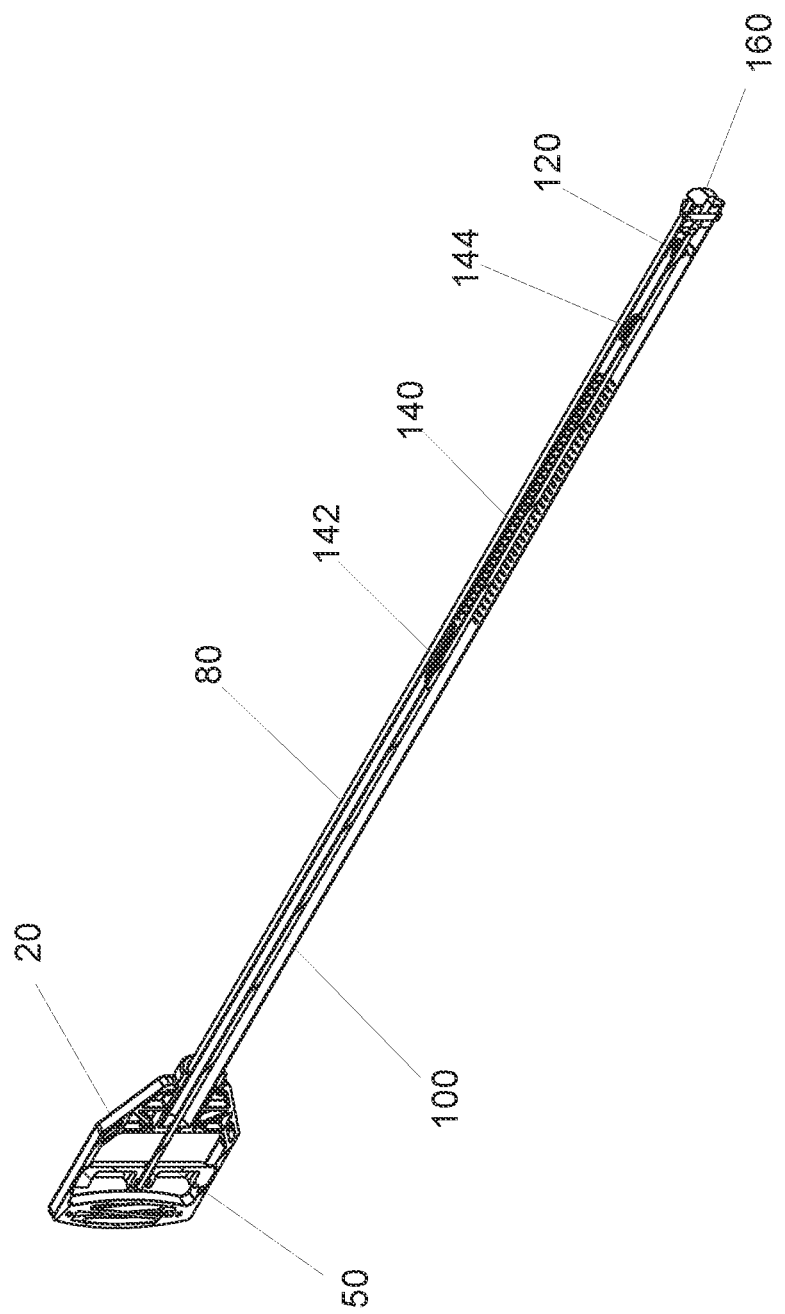
FIG. 10 is a partial top sectional perspective view of an ice fishing net in accordance with an embodiment of the invention.
Figure 11:
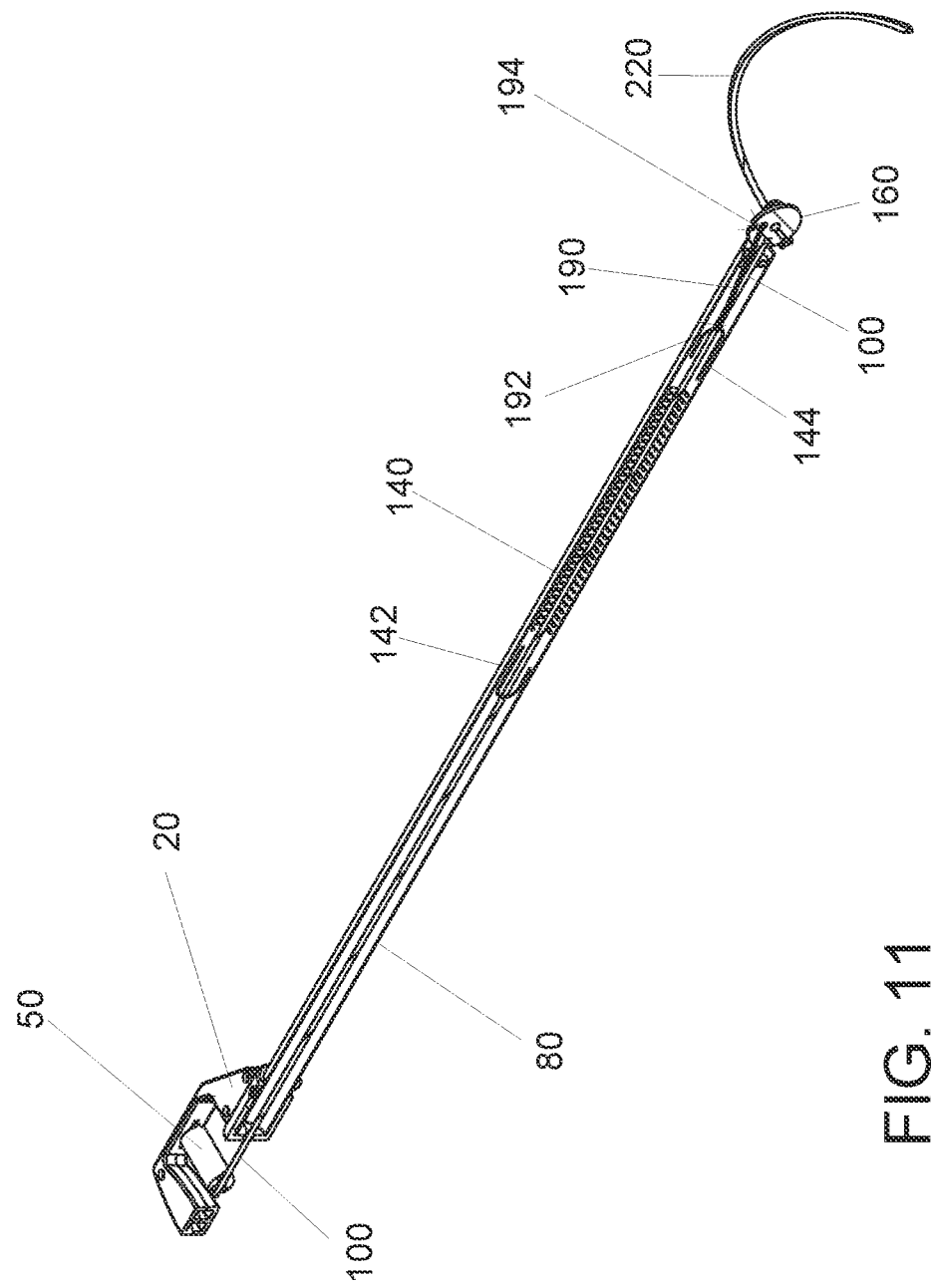
FIG. 11 is a partial side sectional perspective view of an ice fishing net in accordance with an embodiment of the invention.

The orientation of the first rod receiving slot 164 on the wheel 160 defines a first orientation position 166 of the wheel and the orientation of the second rod receiving slot 170 on the wheel 160 defines a second orientation position 172 of the wheel with respect to the circumference, center of the wheel and each other. The rod engages the wheel in the first slot 164 when the wheel 160 and hoop 220 are in the landing position and the rod engages the wheel in the second slot 170 when the wheel 160 hoop 220 are in the netting position (FIG. 7 illustrates the wheel in the landing position and FIG. 9 illustrates the wheel in the netting position).

An aperture 176 extends through the wheel proximate the first rod receiving slot 164. The aperture 176 defines the actuating point 178 of the wheel where a torque is applied to the wheel to rotate the wheel. A linking member 190 extends through the aperture 176. The linking member 190 has a first end 192 coupled to tension spring 140 and a second end 194 coupled to the wheel 160 at the actuation point 178. A force against the linking member 190 by the tension member 140, in a direction along the longitudinal axis of the shaft 80, translates to a torque against the wheel 160. The actuating point 178 is generally positioned between the center 162 of the wheel and the center of the slot 170. The radius of the actuating point 178 determines the amount of torque required to be applied at that point to rotate the wheel, thus, the aperture is preferably located outward from the center to reduce the required torque. Further, the actuating point may be offset from the center of the slot to either increase or decrease the amount of rotation of the wheel when a torque is applied.

The wheel 160 further includes a flat 182 formed on the outer circumference 180 of the wheel 160, wherein a threaded aperture 184 extends into the wheel from the flat. The threaded aperture is used to fix the hoop connector 200 to the wheel with a screw. Of course other fixations, including welding, may be used to fix the connecting member 200 to the wheel 160. The connecting member 200 includes a flat 204 formed on an outer surface of the connecting member. The flat 204 engages with the flat 182 of the wheel 160 and an aperture 205, extending through the connecting member, aligns with the threaded aperture 184 extending into the wheel whereby a screw secures and stabilizes the connecting member 200 against the circumference of the wheel. Ends 202 of hoop connector 200 are adapted for receiving and fixing a portion of hoop 220 therein and apertures 206 may receive fasteners for fixing the ends 202 of the hoop connector 200 to the portion of the hoop 220. The position of the flat 204 is approximately 45 degrees from the first slot 164 however the angle may be increased or decreased to change the orientation of the hoop relative to the longitudinal axis of the shaft 80. Spacers 150 are positioned on both sides of the wheel between the wheel and the wheel receiving slot 90 of the shaft 80. The spacers 150 provide stability to the end of the shaft 80 and reduce canting of the wheel within the slot 90. Rod guide 120 is positioned within the shaft near the wheel end 84 (see FIGS. 5, 6, and 8). The guide 120 includes a central aperture through which the rod slides. The rod guide 120 further provides alignment of the rod 100 with the rod receiving slots 164 and 170 of the wheel 160.

Figure 14:
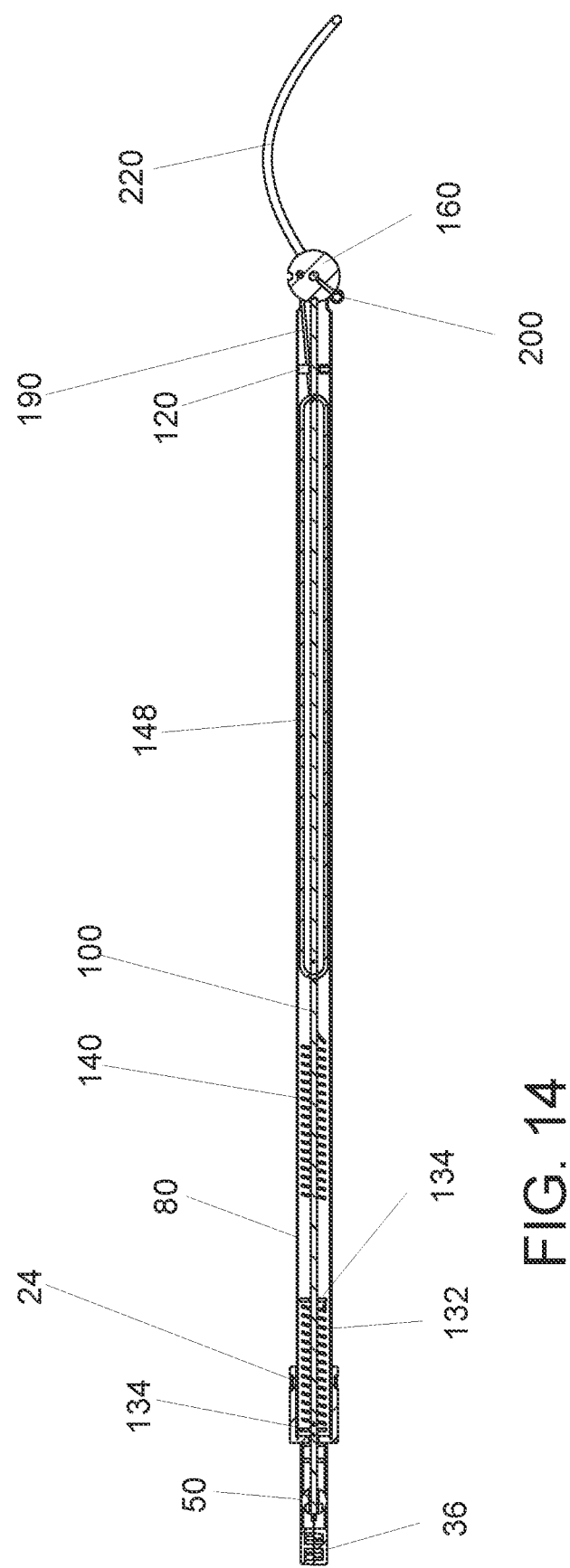
FIG. 14 is a partial sectional side perspective view of the ice fishing net in accordance with another embodiment of the invention.
Figure 15:
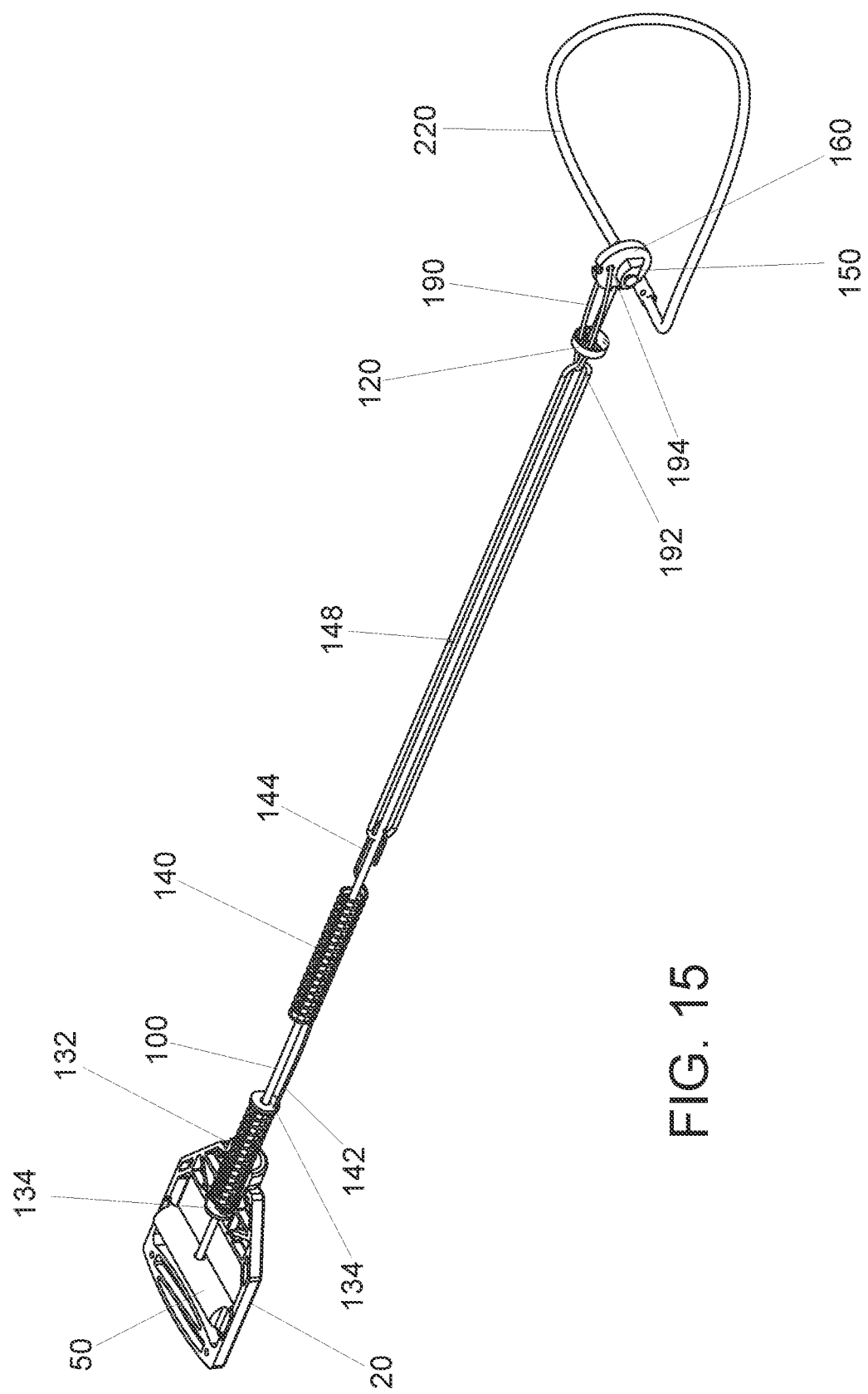
FIG. 15 is a side perspective view of the ice fishing net in accordance with another embodiment of the invention showing the shaft and upper handle portion removed to further illustrate the spring arrangements of an embodiment of the invention.

With reference next to FIGS. 10-15 the actuating mechanism of the ice net apparatus 10 is described in more detail with respect to the wheel 160 and hoop 220 in the landing position. Although a first embodiment of the actuating mechanism is illustrated in FIGS. 10-13 and a second embodiment of the actuating mechanism is illustrated in FIGS. 14-15, those skilled in the art will appreciate that other mechanisms may be incorporated into the hollow shaft 80 to rotate the wheel between a landing position and netting position without departing from the scope of the invention. By way of example, although spring arrangements are described to actuate the grip and the wheel, linear actuators such as solenoids could be used to apply a force against the grip and apply a torque against the wheel.

As illustrated in FIGS. 10-13 rod 100 extends through a central portion of tension spring 140. A first end of the tension spring attaches or couples to rod 100 at fixation 106 and a second end 144 is fixed to linking member 190, thereby coupling or linking the tension spring 140 to the wheel 160. When at rest (attached and coupled), the tension spring 140 is stretched an amount so that constant tension is applied against the grip 50 and wheel 160. Because the grip 50 is engaged to an end of the rod 100, the tension spring pulls the grip 50 and rod towards the shaft and wheel. Further, the other end of the "at rest" tension spring applies a force against link 190 which in turn applies a constant torque against the wheel 160. When the grip 150 is slid backwards towards the palm receiving portion 36 of the handle 20, the rod is pulled out of engagement with wheel 160 and the tension spring causes the wheel to rotate to the netting or second position 172. The tension spring draws the end of the rod 100 into slot 170 when the force against the grip 50 is eliminated. To return the hoop to the landing position the user squeezes the grip to slide the grip towards the palm portion 36 of the handle 20 and simultaneously rotates the hoop towards the landing position. Once in the landing position the user may stop squeezing the grip and the tension spring pulls the rod towards the wheel and into engagement with the first slot 164.

Alternatively, as illustrated in FIGS. 14 and 15, the rod 100 may extend through a central portion of a compression spring 132 and tension spring 140. The compression spring 132 is sandwiched between two washers 134. The first washer is held in place between the compression spring and handle 20 and the second washer is held in place by a fixation point formed on rod 100. The compression spring applies a force to return the grip to its forward position away from the palm portion 36 of the handle 20. When the grip 50 is squeezed the spring 132 compresses and the rod 100 is pulled out of the slot 164 in the wheel. When the user stops squeezing, the compression spring causes the grip 50 and rod 100 to slide forward towards the shaft 80 and wheel 160. The tension spring 140 has a first end 142 fixed to the shaft 80 and the other end 144 coupled to the wheel via a first linking member 148 and second linking member 190. The short or second linking member 190 extends through the passage 124 of rod guide 120 and through the aperture 176 of the wheel 160. When the user squeezes the grip 50 the rod disengages from the wheel and the tension spring causes the wheel to rotate to the netting position.

Figure 16:
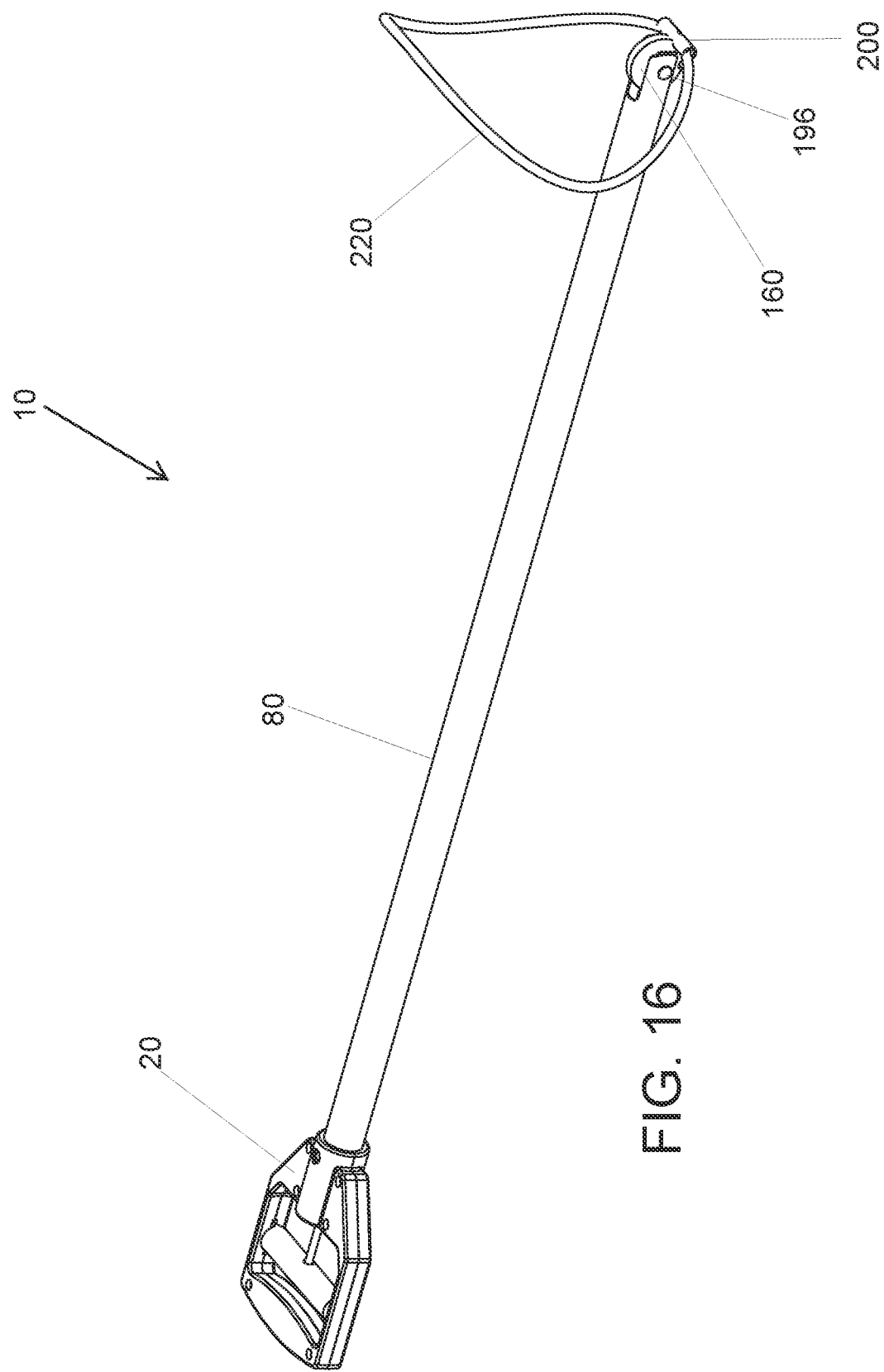
FIG. 16 is a side perspective view of an ice fishing net in accordance with an embodiment of the invention showing the hoop in a netting position.
Figure 17:
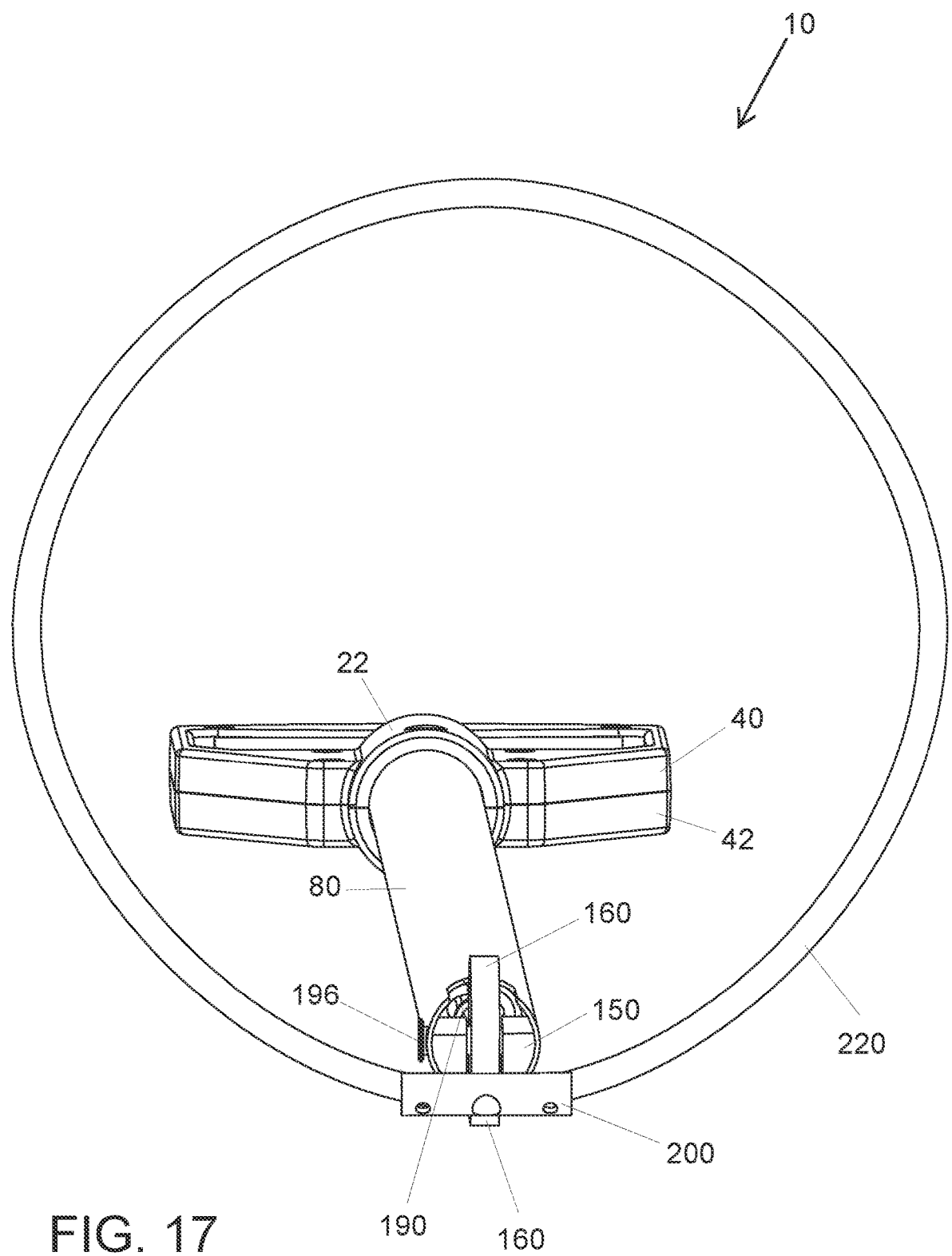
FIG. 17 is an end perspective view of an ice fishing net in accordance with an embodiment of the invention showing the hoop in a netting position and illustrating the roundness of the hoop from the perspective of the xy plane.
Figure 18:
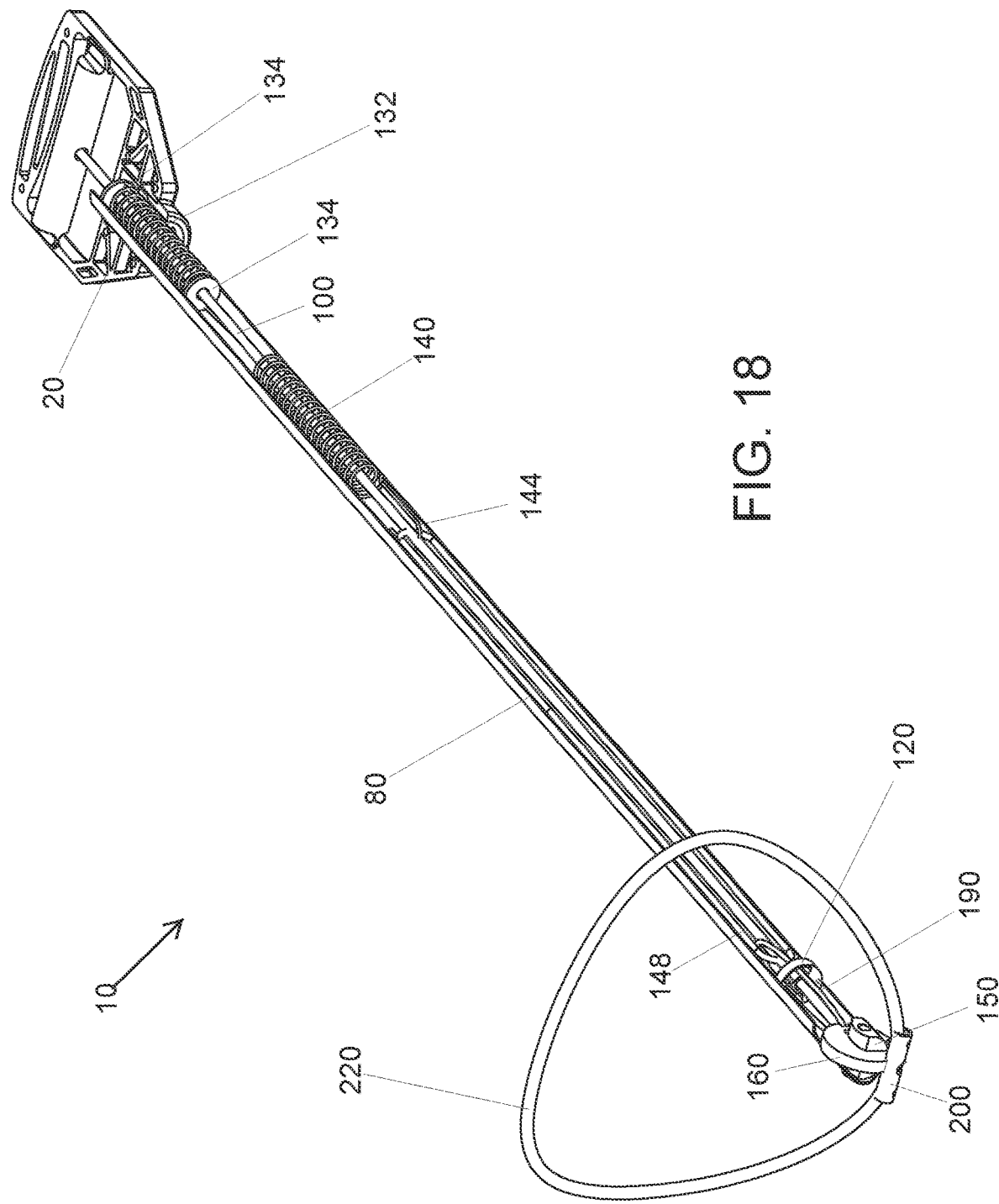
FIG. 18 is a partial sectional side perspective view of the ice fishing net in accordance with an embodiment of the invention showing the upper handle portion removed to further illustrate the spring arrangements of an embodiment of the invention when in the netting position.

As Illustrated in FIGS. 16-18, when the grip is squeezed the spring 132 compresses and the rod 100 slides out of the slot 164 in the wheel 160. The tension spring 140 causes the wheel 160 to rotate to the netting position. When the grip 50 is released, compression spring 132 forces the grip 50 and rod 100 forward. The free end of the rod 100 slides into the second slot 170 and locks the wheel and hoop in the netting position. When a user chooses to reset the net apparatus 10 to the landing position, the user squeezes the grip 50 to slide the grip 50 towards the palm portion 36 of the handle 20. While maintaining pressure on the grip 50, the user rotates the hoop 220 (and wheel 160) towards the landing position. The rod 100 slides into slot 164 when the hoop 220 and wheel 160 are rotated to the landing position. Once the user stops squeezing the grip 50, the compression spring applies a force against the rod causing the grip to slide forward and the rod slides into slot 164.

Figure 19:
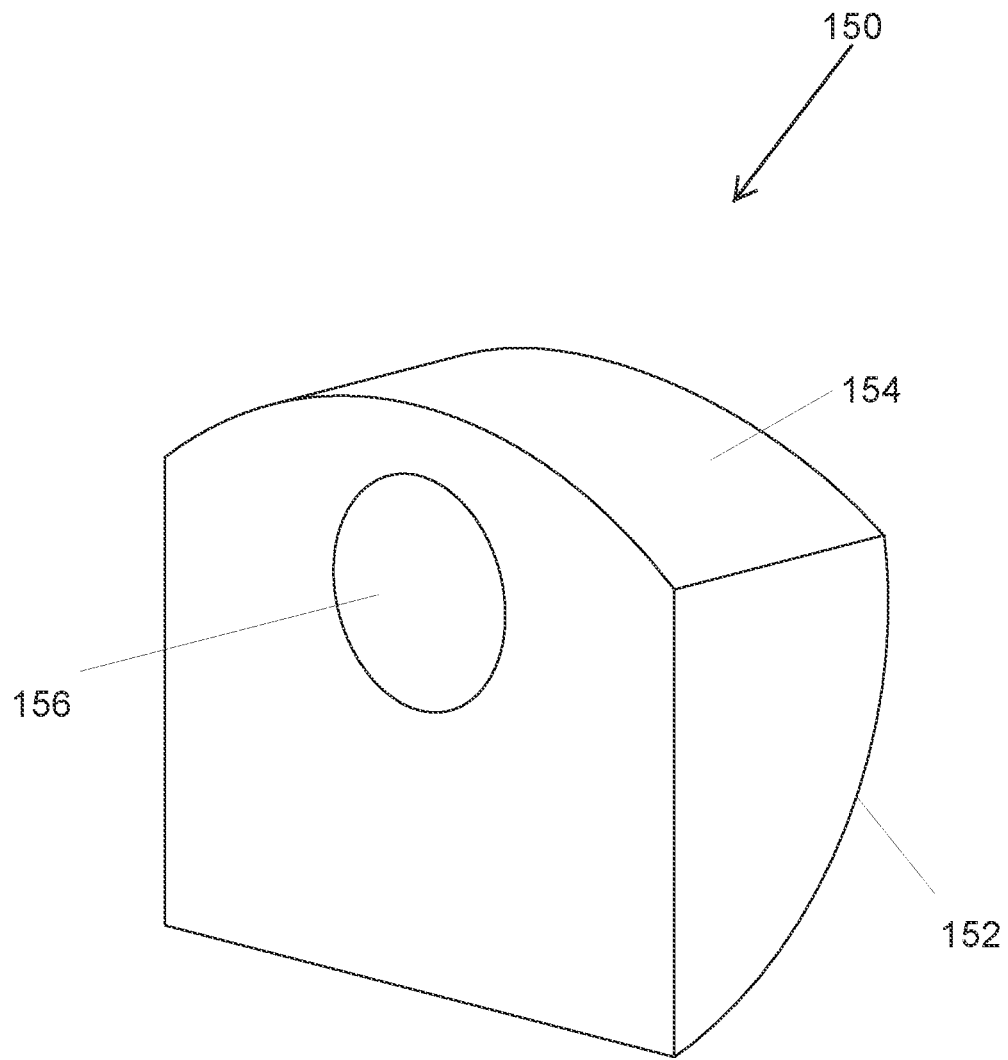
FIG. 19 is a front perspective view of the spacer of the ice fishing net in accordance with an embodiment of the invention.
Figure 20:
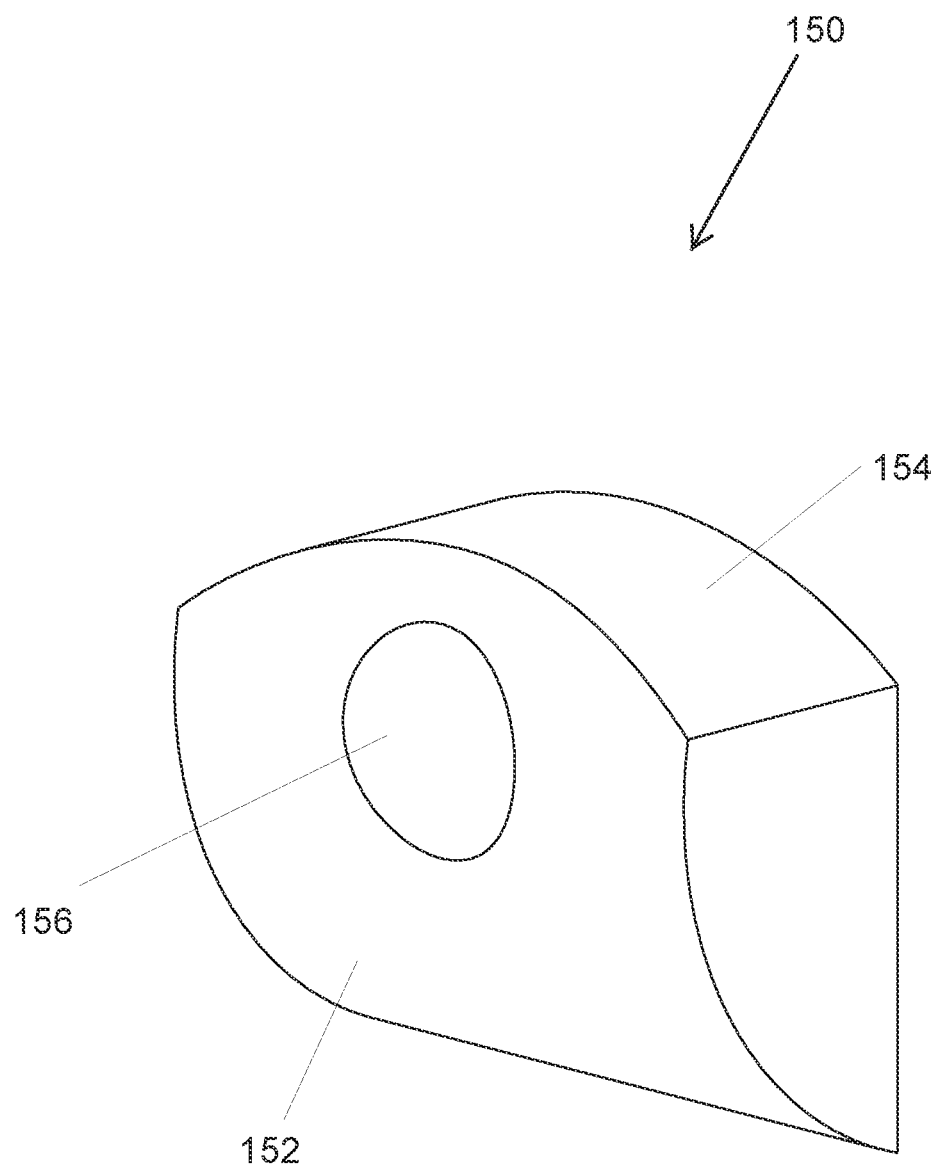
FIG. 20 is a back perspective view of the spacer of the ice fishing net in accordance with an embodiment of the invention.
Figure 21:
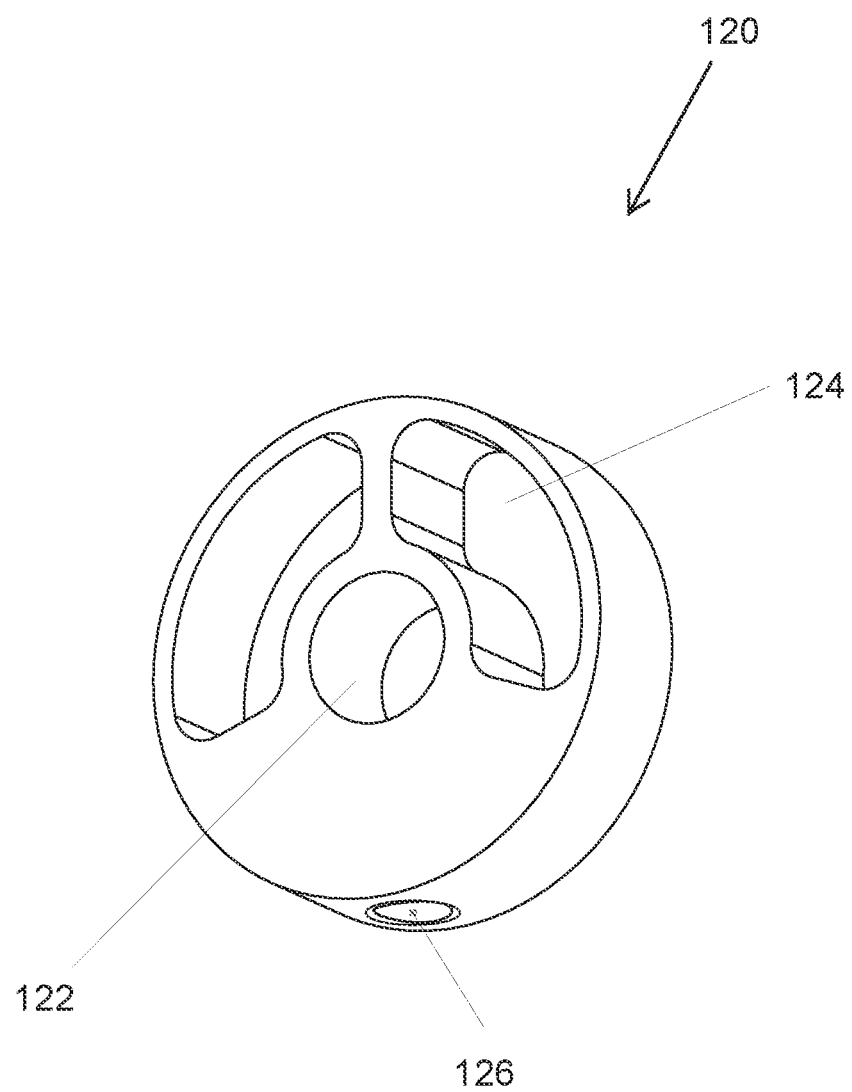
FIG. 21 is a perspective view of the rod guide of the ice fishing net in accordance with an embodiment of the invention.
Figure 22:
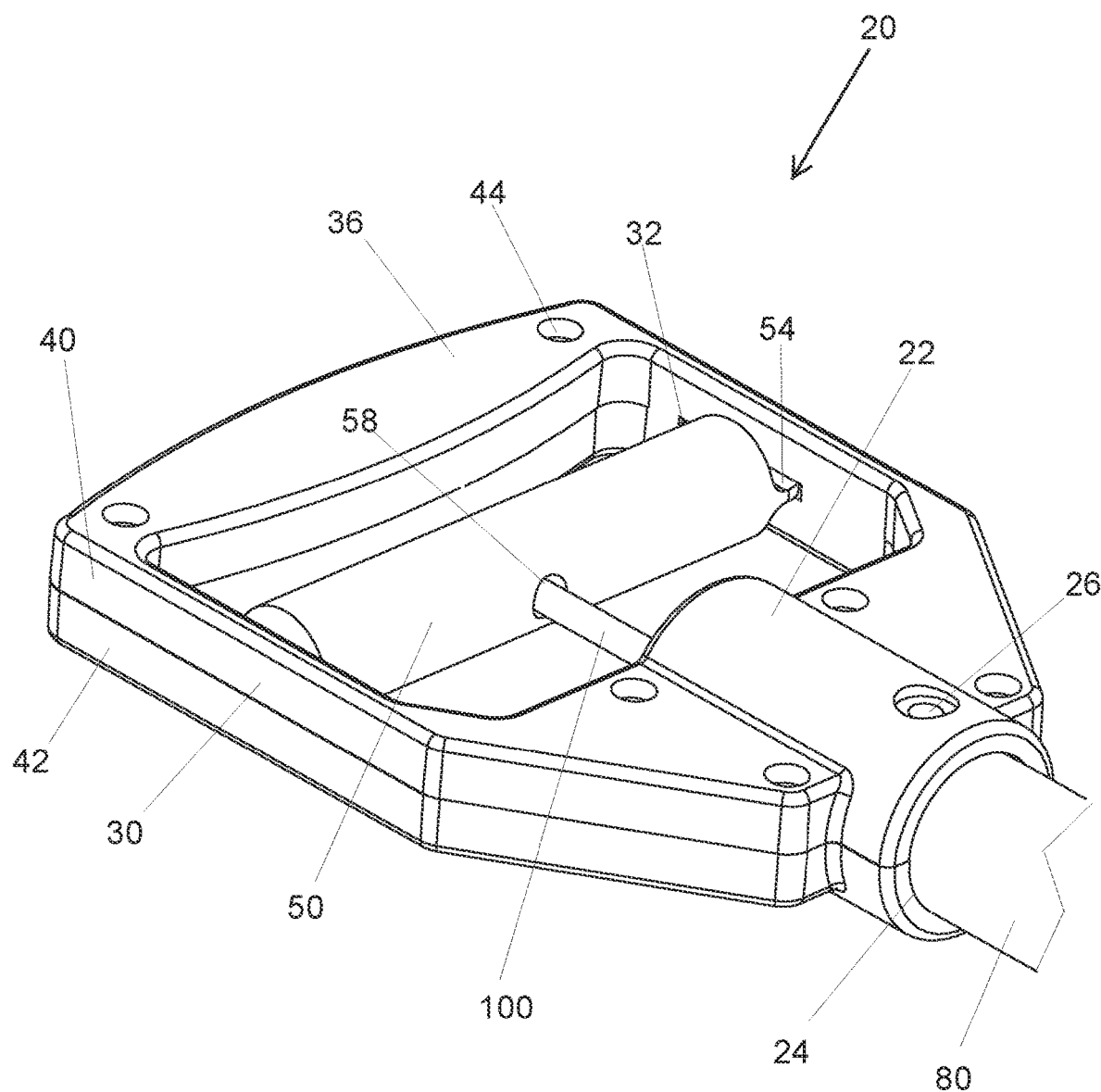
FIG. 22 is a partial sectional perspective view of a portion of the handle end of the ice fishing net in accordance with an embodiment of the invention.
Figure 23:
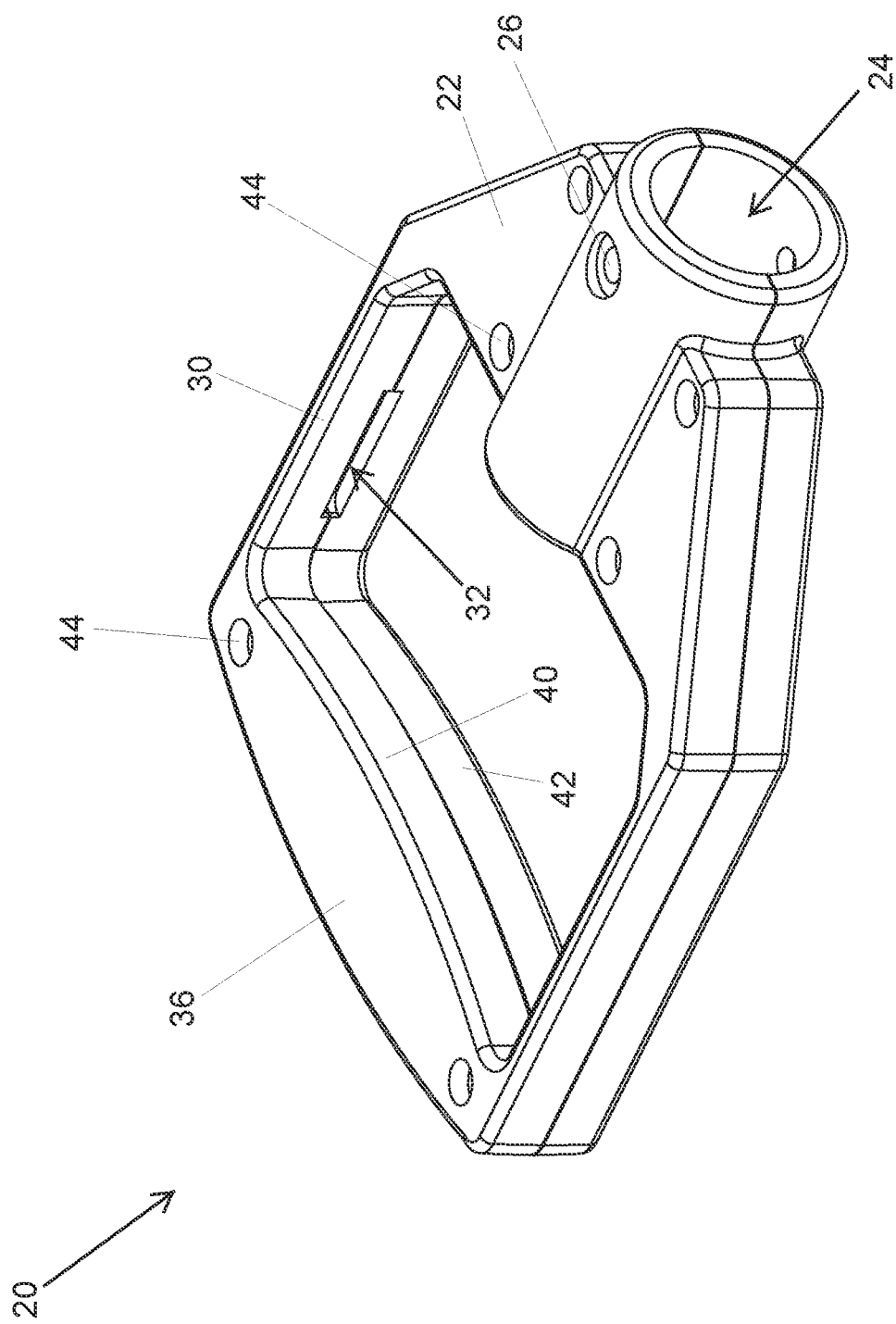
FIG. 23 is a perspective view of a handle of the ice fishing net in accordance with an embodiment of the invention.
Figure 24:
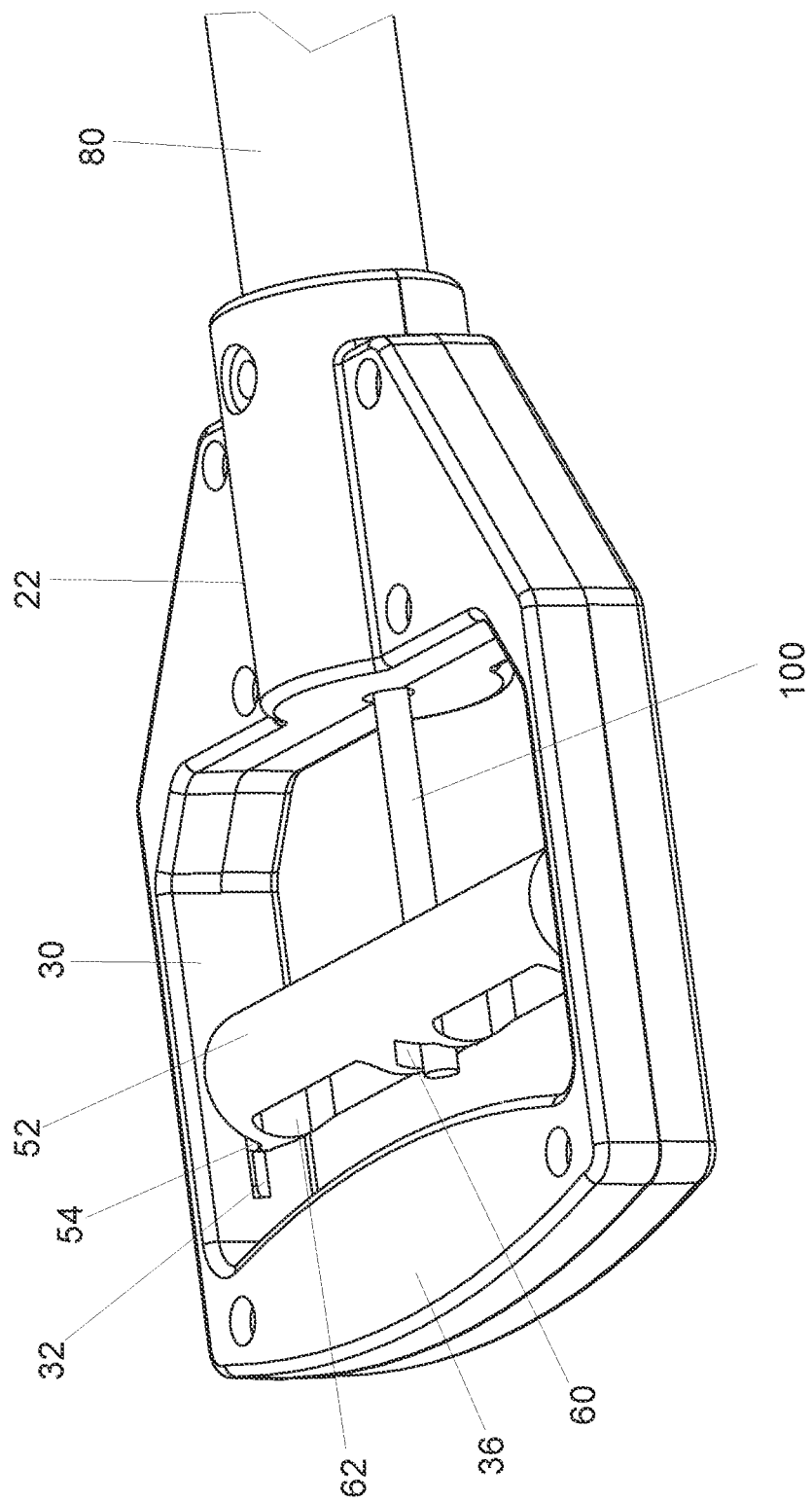
FIG. 24 is a partial sectional perspective view of a portion of the handle end of the ice fishing net in accordance with an embodiment of the invention.
Figure 25:
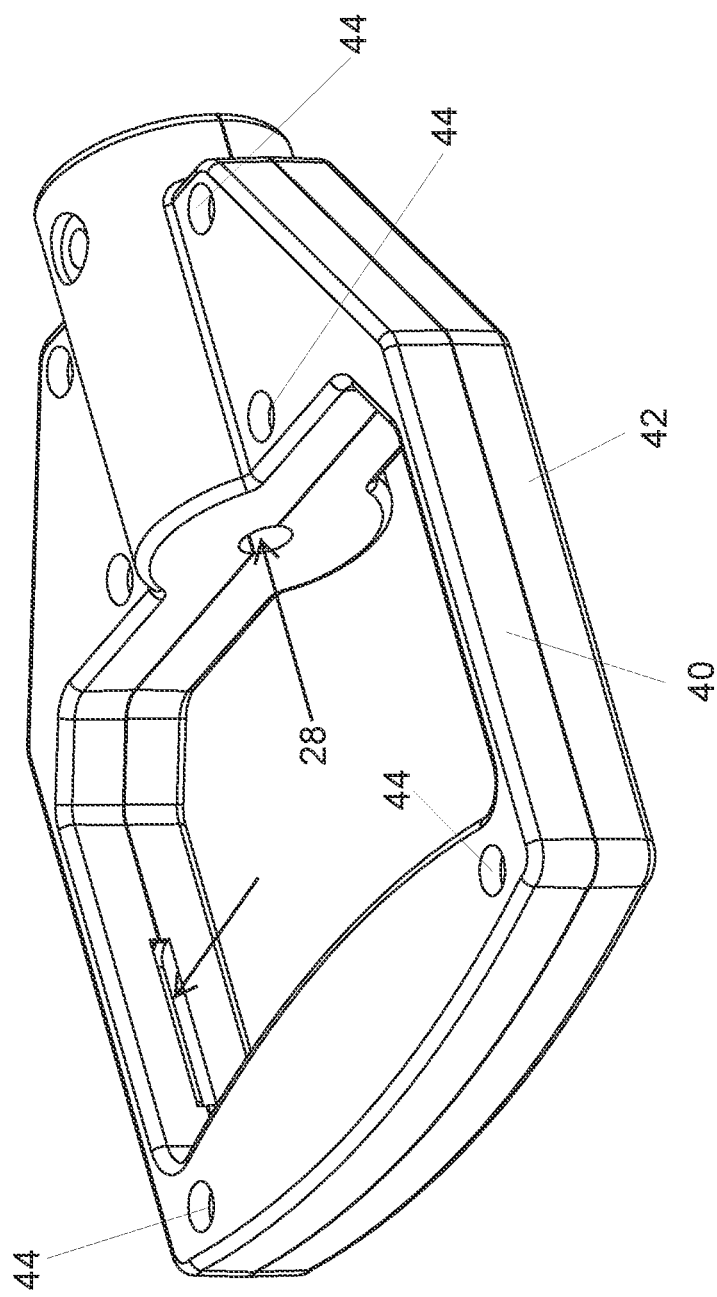
FIG. 25 is a perspective view of a handle of the ice fishing net in accordance with an embodiment of the invention.
Figure 26:
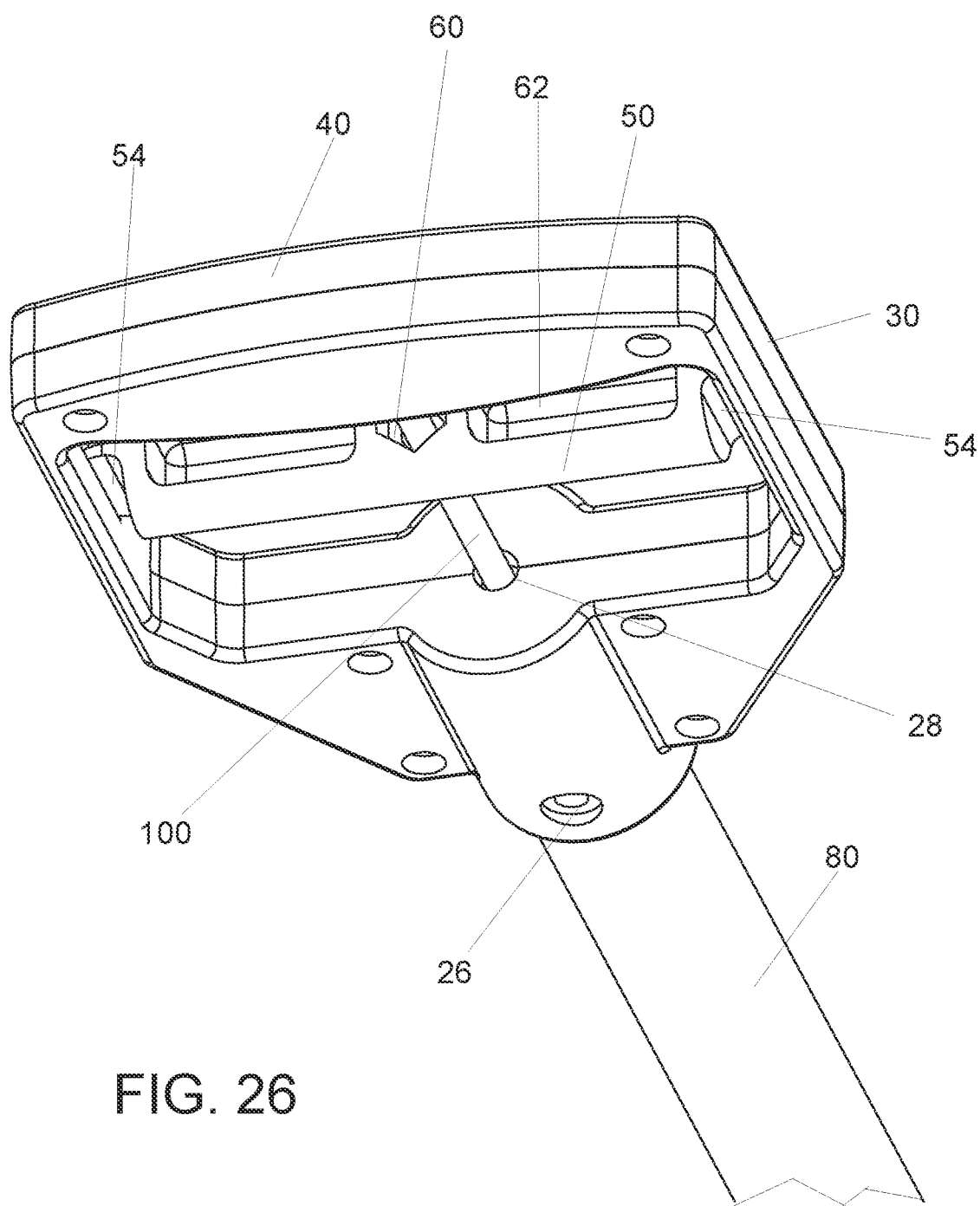
FIG. 26 is a partial sectional bottom perspective view of a portion of the handle end of the ice fishing net in accordance with an embodiment of the invention.
Figure 27:
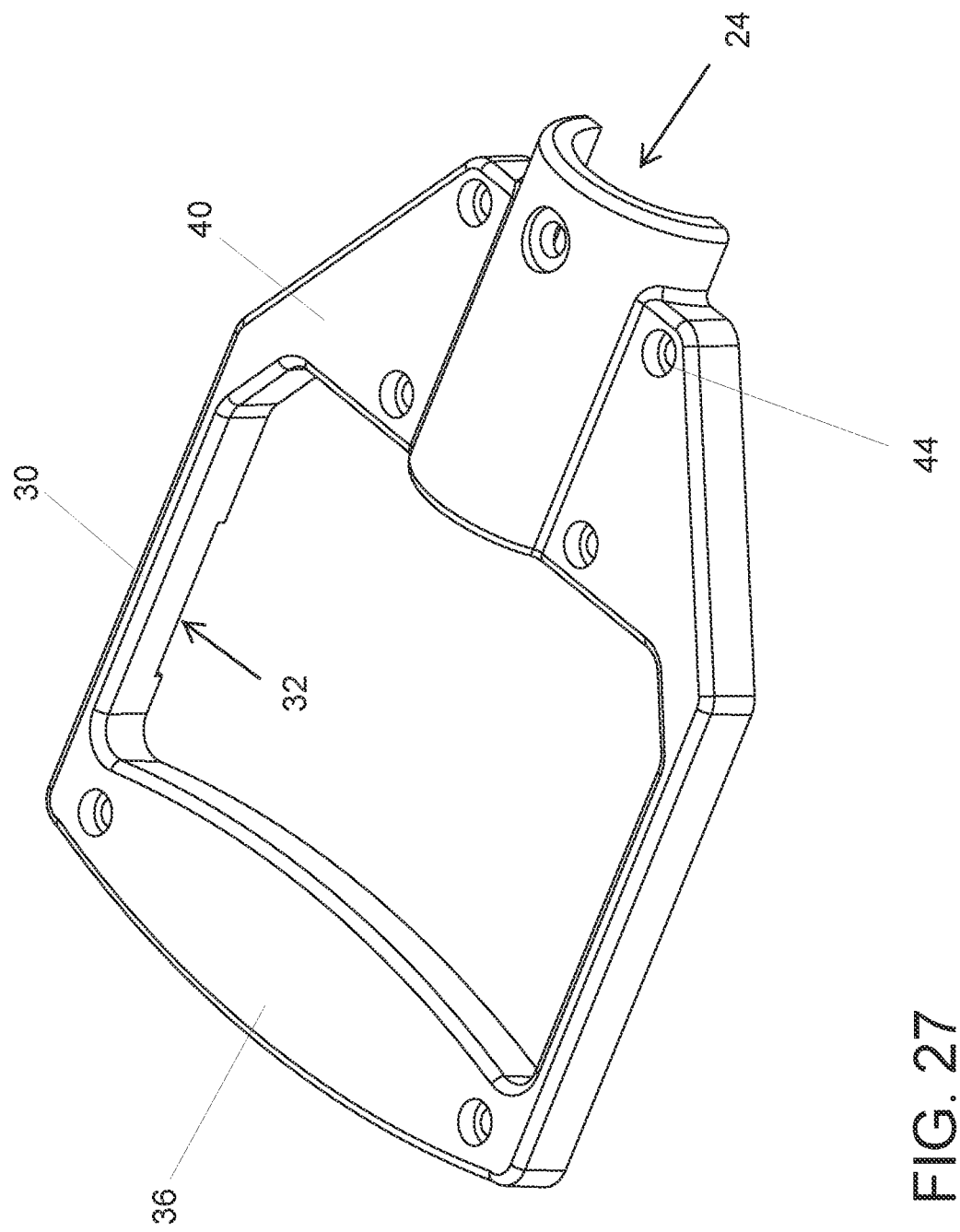
FIG. 27 is a top perspective view of a top halve of a handle of the ice fishing net in accordance with an embodiment of the invention.
Figure 28:
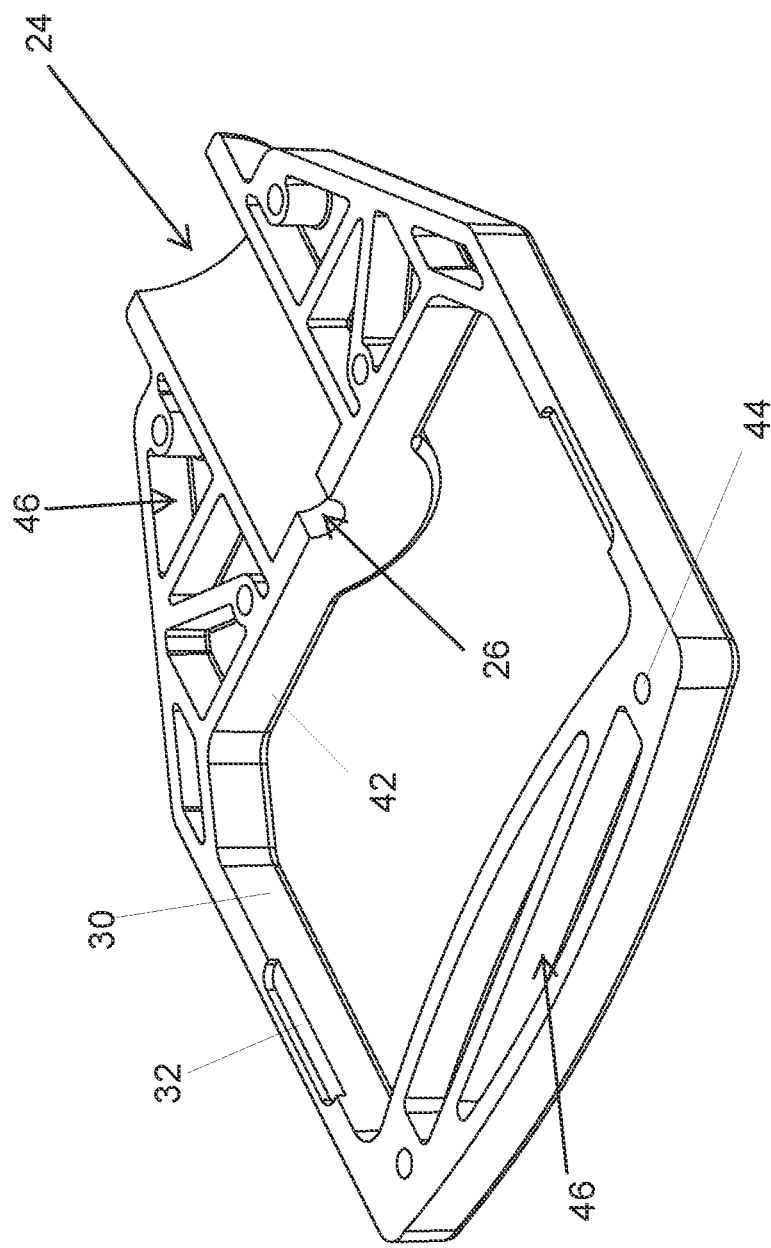
FIG. 28 is a top perspective view of a bottom halve of a handle of the ice fishing net in accordance with an embodiment of the invention.
Figure 29:
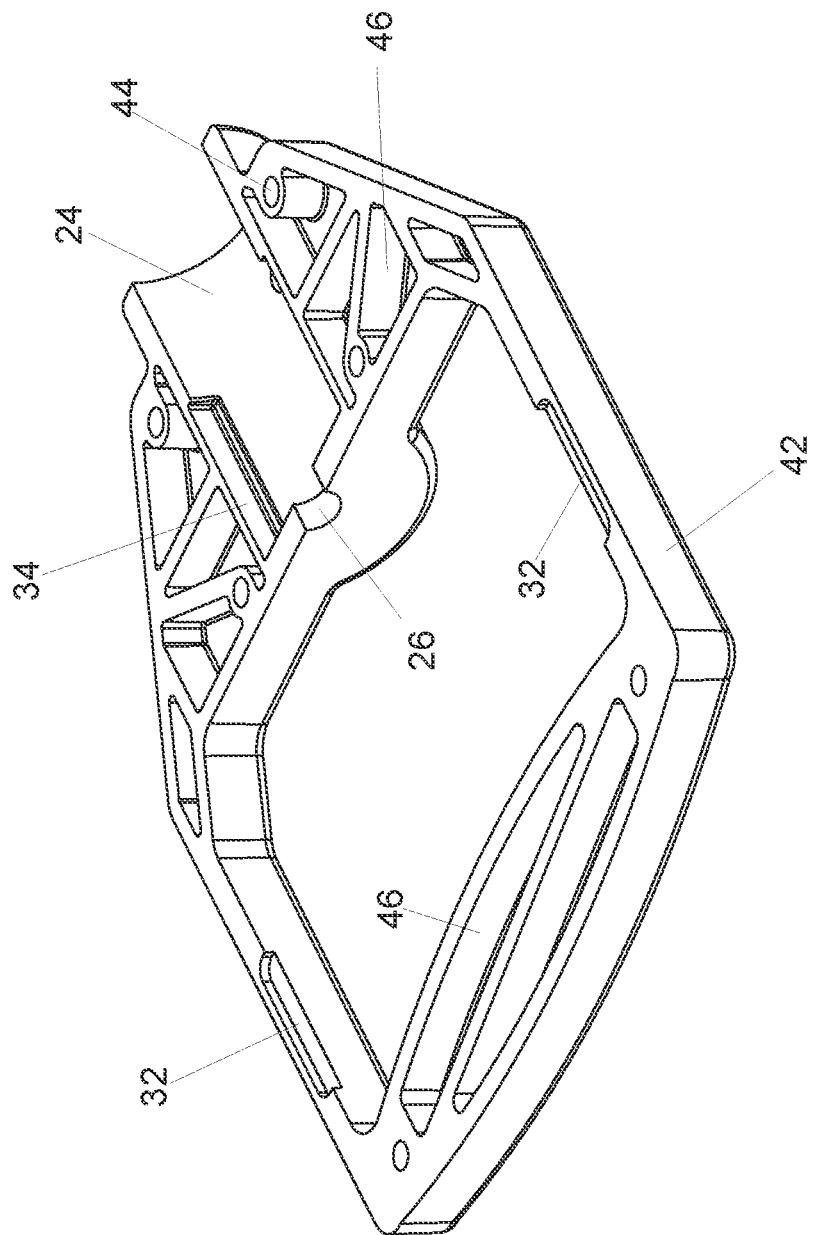
FIG. 29 is a top perspective view of a bottom halve of an alternate handle of the ice fishing net in accordance with an embodiment of the invention.

FIGS. 19-20 illustrates spacer 150. Each spacer 150 includes curve 152 which conforms to the interior diameter of the shaft 80. Spacer further includes a relief radius 154 that provides space for the linking member 190 to move within the shaft as the wheel rotates between the landing and netting positions. An aperture 156 extends through a central portion of the spacer and is adapted for receiving the wheel pin 196 therethrough. FIG. 21 illustrates rod guide 120. The rod guide includes a center aperture 122 through which rod 100 slides. The rod guide 100 is positioned near the wheel end 84 of the shaft and centers the rod 100 within the shaft 80. An aperture 126 extends into the rod guide 120 and may be used to secure the rod guide in a fixed position within the shaft 80. Reliefs or pockets 124 are formed in the rod guide 120 to allow unrestricted movement of portions of the linking member 190 through the rod guide.

With reference to FIGS. 22-29 handle 20 is described in detail. Handle includes a shaft receiving portion 22, side supports 30 and palm receiving member 36. The side supports include channels or groves through which tabs 54 of grip 50 slide. The handle may be made from symmetric or mirroring top halve 40 and bottom halve 42. The two halves are fastened together through securing portions 44. In certain embodiments clots 34 are formed in the shaft receiving socket 24 and are adapted for receiving an end of tension spring 140 overlapping an outside end of the shaft 80. The grip 50 includes a main body 52 around which a user's fingers may grip. A rod receiving aperture 58 extends through the grip and a pocket 60 is formed to retain a nut that engages with an end of rod 100. Additional relief pockets 62 may be formed in the grip 50 to reduce the overall weight of the grip. Tabs 54 extend outwardly from the main body 52 and are well suited for sliding within the grooves formed in the handle 20.

In use, other than netting fish, a user may use the net apparatus 10 to remove slush from an ice hole. Often times when a hole is first drilled in the ice, a considerable amount of ice shavings are left in the hole. Removing the ice shavings may be accomplished with a scoop, however, a considerable amount of water is brought onto the ice along with the shavings when a scoop is used. The ice net apparatus may be slid down the side of an ice hole until the hoop and net are below the shavings. The user may then activate the net to the netting position and pull the net 10 up and out the hole. The spacing or holes in the net may be made small enough so that the ice slush doesn't pass through the netting while the water escapes. In this manner a user may use the net apparatus 10 to quickly remove slush from the ice hole.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An ice fishing net apparatus, said apparatus comprising:
   an elongated shaft having a hollow cross section;
   a handle fixed to a first end of the shaft;
   a grip slidingly engaged with the handle;
   a wheel rotationally attached to a second end of the shaft;
   an actuating rod extending through the hollow cross section of the shaft, the actuating rod having a first end fixed to the grip and a second end aligned and engageable with an outer circumference of the wheel;
   an actuating member having a first end coupled to at least one of the actuating rod and shaft and having a second end coupled with the wheel;
   a hoop connector coupled to the wheel; and
   a hoop adapted for receiving a net and wherein the hoop is coupled to the hoop connector.

2. The apparatus as recited in claim 1, wherein the wheel has a first slot extending into the wheel from an outer circumference of the wheel at a first orientation point, the wheel having a second slot extending into the wheel from the outer circumference of the wheel at a second orientation point, and the wheel having an aperture extending through the wheel at an actuating point, wherein the first orientation point, second orientation point, and actuating point are characterizable in relation to a rotational center of the wheel and each other, and further wherein the hoop connector is coupled to the wheel at a point spaced apart from the first orientation point.

3. The apparatus as recited in claim 2, wherein the actuating member is coupled to the wheel at the actuating point of the wheel.

4. The apparatus as recited in claim 1, wherein a contour of the hoop is round.

5. The apparatus as recited in claim 4, wherein when a length axis of the hoop is oriented and aligned along an x axis of an xyz cartesian coordinate system and a width axis of the hoop is oriented and aligned along a y axis of the xyz cartesian coordinate system, the hoop curves through corresponding xz and yz coordinate planes extending through an origin of the xyz cartesian coordinate system.

6. The apparatus as recited in claim 1 wherein the net has an open end fixed to the hoop and further including a weight coupled to a closed end of the net.

7. The apparatus as recited in claim 1, wherein the actuating member includes a tension spring and connecting member, such that one end of the tension spring is coupled to at least one of the elongated shaft and the actuating rod and another end of the tension spring is connected to the connecting member, wherein the connecting member is coupled to the wheel at an actuating point of the wheel.

8. The apparatus as recited in claim 7, further including a rod guide positioned within a hollow portion of the elongated shaft, wherein the rod guide has a first aperture extending through the rod guide that is adapted for receiving the actuating rod therethrough and second apertures extending through the rod guide that are adapted for receiving the connecting member therethrough.

9. The apparatus as recited in claim 7, further including spacers positioned between the wheel and elongated shaft.

10. An ice fishing net apparatus, said apparatus comprising:
    an elongated shaft having a hollow cross section;
    a handle fixed to a first end of the shaft;
    a grip slidingly engaged with the handle;

a wheel rotationally attached to a second end of the shaft, the wheel having a first slot extending into the wheel from an outer circumference of the wheel at a first orientation point, the wheel having a second slot extending into the wheel from the outer circumference of the wheel at a second orientation point, and the wheel having an aperture extending through the wheel at an actuating point, wherein the first orientation point, second orientation point, and actuating point are characterizable in relation to a rotational center of the wheel and each other;

an actuating rod extending through the hollow cross section of the shaft, the actuating rod having a first end fixed to the grip and a second end aligned with the circumference of the wheel;

an actuating member having a first end coupled to at least one of the actuating rod and shaft and having a second end coupled to the wheel, wherein the actuating member is coupled to the wheel at the actuating point of the wheel;

a hoop connector coupled to the wheel and spaced apart from the first orientation point; and a hoop adapted for receiving a net and wherein the hoop is coupled to the hoop connector, wherein when a length axis of the hoop is oriented along an x axis of an xyz cartesian coordinate system and a width axis of the hoop is oriented along a y axis of the xyz cartesian coordinate system, the hoop curves through corresponding xy, xz and yz coordinate planes extending through an origin of the xyz cartesian coordinate system.

11. The apparatus as recited in claim 10 wherein the net has an open end fixed to the hoop and further including a weight coupled to a closed end of the net.

12. The apparatus as recited in claim 10, wherein the actuating member includes a tension spring such that one end of the tension spring is linked to the wheel at the actuating point of the wheel.

13. The apparatus as recited in claim 12, further including a rod guide positioned within the hollow cross section of the elongated shaft, wherein the rod guide has an aperture extending through the rod guide that is adapted for receiving the actuating rod therethrough.

14. The apparatus as recited in claim 12, further including spacers positioned between the wheel and elongated shaft.

15. An ice fishing net apparatus, said apparatus comprising:

an elongated shaft having a hollow cross section;
a handle fixed to a first end of the shaft;
a grip slidingly engaged with the handle;
a wheel rotationally attached to a second end of the shaft, the wheel having a first slot extending into the wheel from an outer circumference of the wheel at a first orientation point, the wheel having a second slot extending into the wheel from the outer circumference of the wheel at a second orientation point, and the wheel having an aperture extending through the wheel at an actuating point, wherein the first orientation point, second orientation point, and actuating point are characterizable in relation to a rotational center of the wheel and each other;

an actuating rod extending through the hollow cross section of the shaft, the actuating rod having a first end fixed to the grip and a second end aligned with the circumference of the wheel;

a wheel actuating member including a wheel tension spring, wherein one end of the wheel tension spring is coupled to the elongated shaft and another end of the wheel tension spring is linked to the wheel at the actuating point of the wheel;

a grip actuating member including a grip compression spring, wherein one end of the grip compression spring is coupled to the handle and another end of the grip compression spring is coupled to the actuating rod;

a hoop connector coupled to the wheel and spaced apart from the first orientation point; and a hoop adapted for receiving a net and wherein the hoop is coupled to the hoop connector.

16. The apparatus as recited in claim 15, wherein the hoop appears round from a perspective in an xy coordinate plane of a cartesian coordinate system when a length axis of the hoop is oriented along an x axis of the cartesian coordinate system and a width axis of the hoop is oriented along a y axis of the cartesian coordinate system.

17. The apparatus as recited in claim 16, wherein the length axis of the hoop is curved in both xz and yz coordinate planes extending through an origin of the xyz cartesian coordinate system.

18. The apparatus as recited in claim 15 wherein the net has an open end fixed to the hoop and further including a weight coupled to a closed end of the net.

19. The apparatus as recited in claim 15, further including a rod guide positioned within the hollow cross section of the elongated shaft, wherein the rod guide has an aperture extending through the rod guide that is adapted for receiving the actuating rod therethrough.

20. The apparatus as recited in claim 15, further including spacers positioned between the wheel and elongated shaft.

* * * * *